United States Patent [19]
Reichard

[11] Patent Number: 5,079,494
[45] Date of Patent: Jan. 7, 1992

[54] FAST RESPONSE MOTOR CURRENT REGULATOR

[75] Inventor: John G. Reichard, Milwaukee, Wis.

[73] Assignee: Thor Technology Corporation, Milwaukee, Wis.

[21] Appl. No.: 403,308

[22] Filed: Aug. 31, 1989

Related U.S. Application Data

[63] Continuation-in-part of Ser. No. 356,375, May 23, 1989, and a continuation-in-part of Ser. No. 400,460, Aug. 29, 1989, Pat. No. 4,988,939, which is a continuation-in-part of Ser. No. 389,874, Aug. 4, 1989, Pat. No. 5,015,927.

[51] Int. Cl.$^5$ .............................................. H02P 5/40
[52] U.S. Cl. ...................................... 318/811; 363/41
[58] Field of Search .................. 363/41; 318/811, 803, 318/807-816

[56] References Cited

U.S. PATENT DOCUMENTS

| | | |
|---|---|---|
| 3,980,933 | 9/1976 | Piatkowski, Jr. . |
| 4,027,215 | 5/1977 | Knight et al. . |
| 4,238,717 | 12/1980 | Knight et al. . |
| 4,403,177 | 9/1983 | Weber et al. . |
| 4,446,406 | 5/1984 | Uzuka . |
| 4,492,903 | 1/1985 | Knight et al. . |
| 4,495,450 | 1/1985 | Tokizaki et al. . |
| 4,520,320 | 5/1985 | Potzick et al. . |
| 4,611,157 | 9/1986 | Miller et al. . |
| 4,642,537 | 2/1987 | Young . |
| 4,743,815 | 5/1988 | Gee et al. . |
| 4,933,621 | 6/1990 | MacMinn et al. . |

FOREIGN PATENT DOCUMENTS

0276625 12/1987 European Pat. Off. .

OTHER PUBLICATIONS

"Practical Indirect Position Sensing for a Variable Reluctance Motor", Thesis by Walter D. Harris, MIT, May 1987.

*Primary Examiner*—David Smith, Jr.
*Attorney, Agent, or Firm*—Andrus, Sceales, Starke & Sawall

[57] ABSTRACT

High speed fast response PWM current control regulation methodology and circuitry samples the required peak motor current value from a previous PWM cycle and calculates the required peak motor current value for the present PWM cycle and repeats the sampling and calculating every PWM cycle and updates the new required peak motor current value every PWM cycle. The required peak motor current value for the present PWM cycle is calculated according to the equation $$I(\text{peak present}) = I(\text{command}) + 0.5I(\text{peak last}) - 0.5I(\text{turn-on}),$$

where I(peak present) is the required peak motor current value for the present PWM cycle, I(command) is the commanded motor current value, I(peak last) is the previous required peak motor current value from the immediately preceeding PWM cycle, and I(turn-on) is the turn-on motor current value.

46 Claims, 21 Drawing Sheets

FAST RESPONSE MOTOR CURRENT REGULATOR

CROSS REFERENCE TO RELATED APPLICATIONS

This application is a continuation-in-part of U.S. application Ser. No. 07/356,375, filed May 23, 1989, entitled "Switched Reluctance Electric Motor With Regeneration Current Commutation" and a continuation-in-part of U.S. application Ser. No. 07/400,460, now U.S. Pat. No. 4,988,9 , filed Aug. 29, 1989, entitled "Electric Motor With Variable Commutation Delay" which is a continuation-in-part of U.S. application Ser. No. 07/389,874, filed Aug. 4, 1989, now U.S. Pat. No. 5,015,927, entitled "Electric Motor With Regeneration Current Commutation".

BACKGROUND

Application Ser. No. 07/356,375

Application Ser. No. 07/356,375 relates to commutation control methods and circuitry for switched reluctance electric motors.

In a plural phase switched reluctance electric motor, the phases are energized in cyclic sequence, generally one phase at a time, though some overlap may be desirable in certain applications. The cyclic sequence of energization of the phases creates a rotating magnetic field producing a torque on the rotor which then rotates to follow the rotating magnetic field. Generally, when the rotor reaches a maximum alignment position relative to the presently energized phase, the next phase should then be energized, to maximize torque production. The change from one motor state energizing one phase to the next motor state energizing the next phase is called commutation. It is desirable to know the position of the rotor, in order to select the proper commutation timing and phase energization, and hence provide the optimum magnetic field pattern for producing optimum torque on the rotor.

Various commutation methods are known in the prior art for commutating to the next motor state to energize the next phase. Various external sensors are known for sensing rotor position. A drawback of external sensors is that they add cost to the motor control, and require additional wiring.

Various sensorless motor control systems are known in the prior art. These systems sense a given motor parameter, such as inductance as measured by back EMF, a frequency change in switching because of an inductance change, a test pulse current in an non-energized winding, and so on. A drawback of these methods is that they are motor-dependent, i.e. inductance varies from motor to motor and with differing sizes, manufacturers, and construction methods. Another drawback is that such methods only provide a general reference point for where the motor is in its rotation.

Application Ser. No. 07/356,375 provides a control method which is motor-independent, and which senses an actual change in motor operation, not just a change in a motor parameter. Application Ser. No. 07/356,375 further enables an exact position reference for the motor. In application Ser. No. 07/356,375, regeneration current is sensed in the energized phase of a switched reluctance electric motor. In the preferred embodiment, individual phase regeneration current is sensed. In an alternate embodiment, bus regeneration current is sensed.

Application Ser. No. 07/389,874

Application Ser. No. 07/389,874 relates to commutation control methods and circuitry for electric motors including at least three phases energized in a cyclic sequence having a plurality of states, wherein during each state, two of the phases are energized and the third phase is unenergized.

In a plural phase electric motor, the phases are energized to create a rotating magnetic field, which the rotor will follow due to the torque produced thereon. To sustain rotation of the rotor, the phase windings are energized in a given sequence having a plurality of states. The change from one state to the next state is called commutation. Commutation ensures continued rotation of the magnetic field, and hence continued rotation of the rotor. It is desirable to know the position of the rotor, in order to select the proper commutation timing and energization state of the various windings, and hence provide the optimum magnetic field pattern for producing optimum torque on the rotor. When the rotor passes a given position, it is desired to commutate to the next state in the energization sequence of the phase windings, to continue to apply torque to the rotor.

In the control of variable speed electric motors, it is desirable to have feedback of motor speed. This feedback typically consists of an external sensor that connects to the motor shaft and directly reads the rotor information. This external sensor adds an undesirable cost to the motor control, and requires additional wiring to the motor. The burden of these extra wires is compounded in applications such as air conditioning compressors, where the motor is hermetically sealed. It is therefore desired in various applications to eliminate external sensors and extra wires.

Various sensorless motor control systems are known in the prior art. In one method, back EMF of an unenergized phase is sensed to control commutation to the next state. In another method, changing reluctance of the unenergized phase is sensed as a function of rotor position, to control commutation to the next state. In the latter method, the unenergized phase winding is pulsed with a test current to determine changing reluctance.

In application Ser. No. 07/389,874, regeneration current is sensed from the unenergized phase, and the motor is commutated to the next state in response to such regeneration current. In the preferred embodiment, bus regeneration current is sensed with all commutation switches off. In an alternate embodiment, individual phase regeneration current is sensed.

Application Ser. No. 07/400,460

Application Ser. No. 07/400,460 relates to commutation control methods and circuitry for electric motors including at least three phases energized in a cyclic sequence having a plurality of states, wherein during each state, two of the phases are energized and the third phase is unenergized. In application Ser. No. 07/400,460, a method is provided for regulating excessive current in a phase of the motor when switching from one pair of phases to the next pair of phases, i.e. when commutating from one state to the next state.

In one type of motor drive, it is desirable to turn on one of the power switches and to pulse width modulate the other power switch, corresponding to the phases being driven, to regulate current in the pair of phases. This method of current regulation allows the motor phase current to flow through the switch that is held on and either through the switch that is being pulse width modulated or through the diode that is connected in reverse parallel therewith. This produces a lower deviation in phase current for a given pulse width modulation frequency than if both switches were pulse width modulated. A problem with this type of current control, however, is that the current flowing through the diode does not appear on the bus current sensor, and it is undesirable to have a current sensor in each of the motor phases to read such current because of the added cost. Another problem occurs upon commutation because if the current in the newly energized phase builds up faster than the current dissipates in the previously energized phase, a current overshoot or spike will occur. This current spike can damage the motor's magnets and power switches.

One manner known in the prior art to eliminate or at least minimize the noted potentially destructive current spikes is to provide a commutation delay interval between commutations from state to state, during which delay interval all phases are unenergized, to minimize current spikes upon commutation. The duration of the delay interval is chosen to balance the trade-off between a maximum delay affording the best protection against current spikes versus a minimum delay which is desired to provide maximum energization current to the phases. If the power switches are held off too long, particularly at high motor speeds, there is not sufficient time to efficiency and power suffers.

The invention in application Ser. No. 07/400,460 overcomes the noted trade-off of a fixed delay interval and optimizes the delay interval for different operating conditions of the motor, to provide maximum delay when needed to eliminate current spikes, and to provide minimum delay when unneeded, to in turn provide maximum energization current to the phases. The invention in application Ser. No. 07/400,460 provides a variable co interval whose duration is varied according to a given motor operating parameter during operation of the motor, to provide the noted optimization.

SUMMARY OF PRESENT INVENTION

The present invention relates to current regulation schemes for energizing electric motors, and more particularly to PWM (pulse width modulated) current control regulation.

The present invention provides a method and system for regulating the average current of a PWM current waveform used in a motor drive without restricting the bandwidth by filtering the current feedback signal. This is accomplished by setting the peak current level for the motor and recalculating same every PWM cycle.

Current regulation schemes in the prior art generally use either peak current regulation or time averaged current regulation. Peak current regulation controls the peak current without regard for the average current, which results in a drop in average current and motor torque as speed increases. Time averaged current regulation uses a highly filtered current signal to obtain the average current, which severely limits the frequency response of the current loop and degrades the overall response time of the drive. The present invention overcomes these disadvantages and maintains full available motor torque at all speeds without limiting the frequency response of the current loop.

To maintain constant torque as motor speed changes, it is necessary to regulate the average current in the motor. As noted above, in the prior art this was accomplished or approximated by either time averaging (filtering) of the phase current waveform, or by peak current regulation. When time averaging is used, individual current sensors in each motor phase or PWM operation of both power switches in each switch pair is necessary to continuously monitor the motor current. Each of these methods has a cost and/or performance limitation when applied to a motor drive.

Individual current sensors in each motor leg allows continuous measurement of the motor phase currents. When this is used in the prior art, the phase current is time averaged and compared to a reference to allow regulation of average current. This method has the cost disadvantage of requiring three isolated current sensors, and the performance disadvantage of increasing the response time of the control due to the time averaging of the current waveform.

Peak current regulation as used in the prior art limits the peak current of each PWM cycle to a fixed level. This method has the advantages of using only one current sensor and having a faster response time since the current waveform is not time averaged. However, this method has the disadvantage of reduced torque at high motor speeds. This is caused by the back EMF of the motor which increases as speed increases and causes increased ripple in the current waveform. Different motor inductances will also cause different amounts of ripple and different average currents. If the peak current is held constant, the average current decreases. This decrease in average current results in proportionately less torque.

PWM switching of both switches instead of one switch forces the motor phase current to flow through the DC bus sensor. While this allows measurement of all phase currents using one current sensor, in the prior art the phase current is time averaged or peak regulated resulting in the performance limitations noted above. Further disadvantages are increased losses in the solid state switches, increased losses in the motor due to higher ripple in the current waveform, and increased motor noise.

The present invention maintains average current at a fixed level regardless of motor speed and inductance without adding delays by time averaging the current waveform or requiring more than one current sensor.

BRIEF DESCRIPTION OF THE DRAWINGS

Parent Applications

Present Invention

Figure 24:
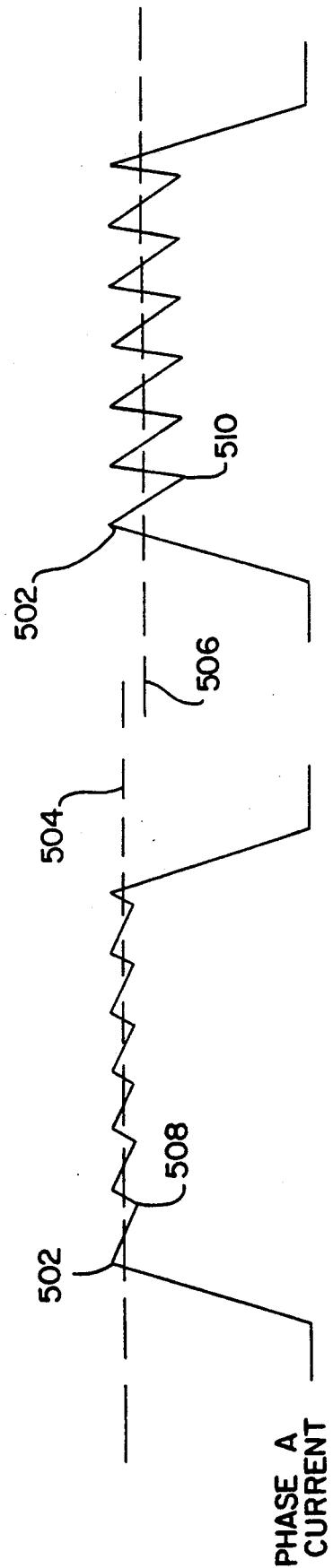

FIG. 24 is a waveform diagram showing different average phase current.

Figure 25:
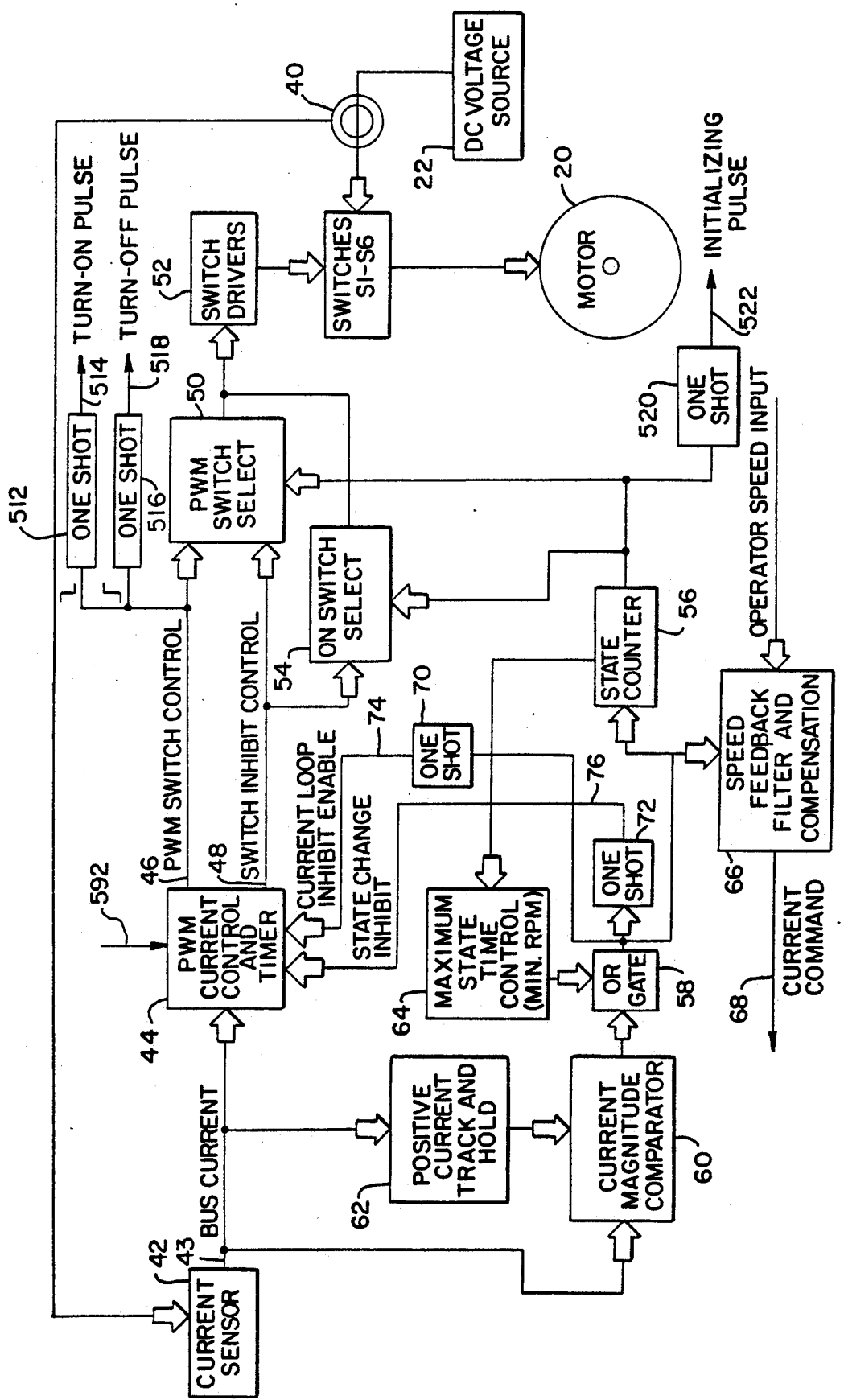

FIG. 25 shows control circuitry in accordance with the present invention.

Figure 26:
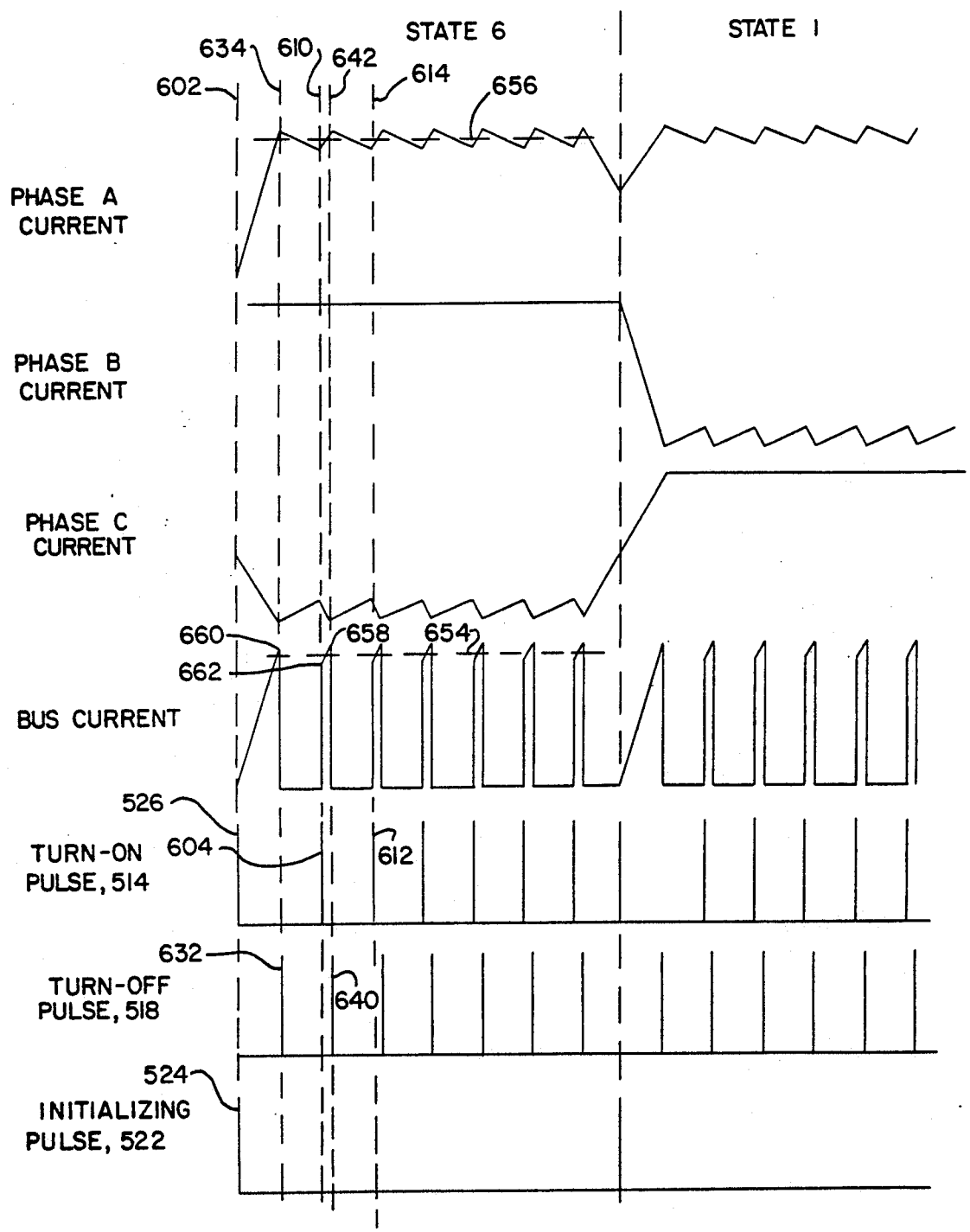

FIG. 26 is a waveform diagram illustrating operation of the present invention.

Figure 27:
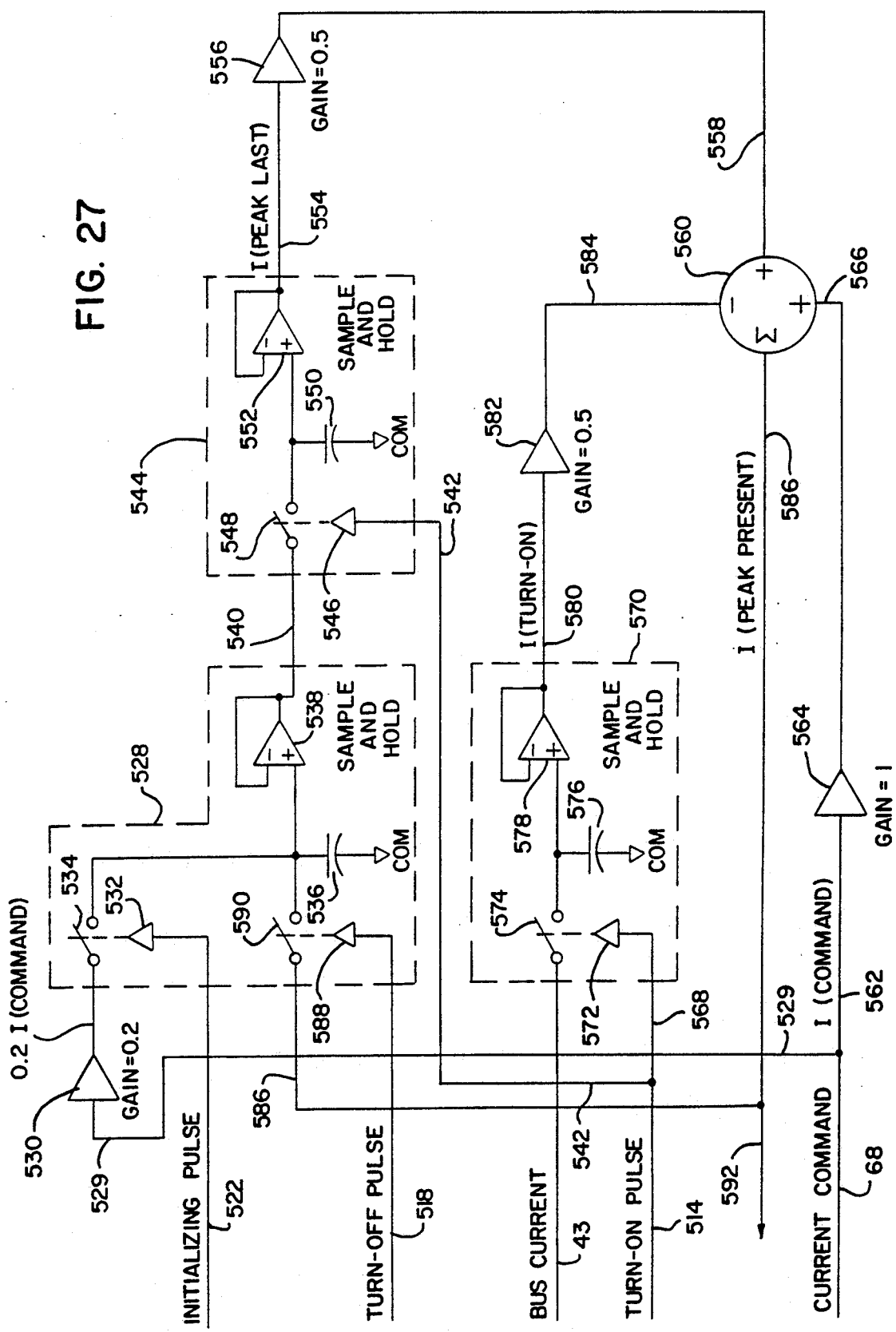

FIG. 27 shows further control circuitry in accordance with the present invention.

Figure 28:
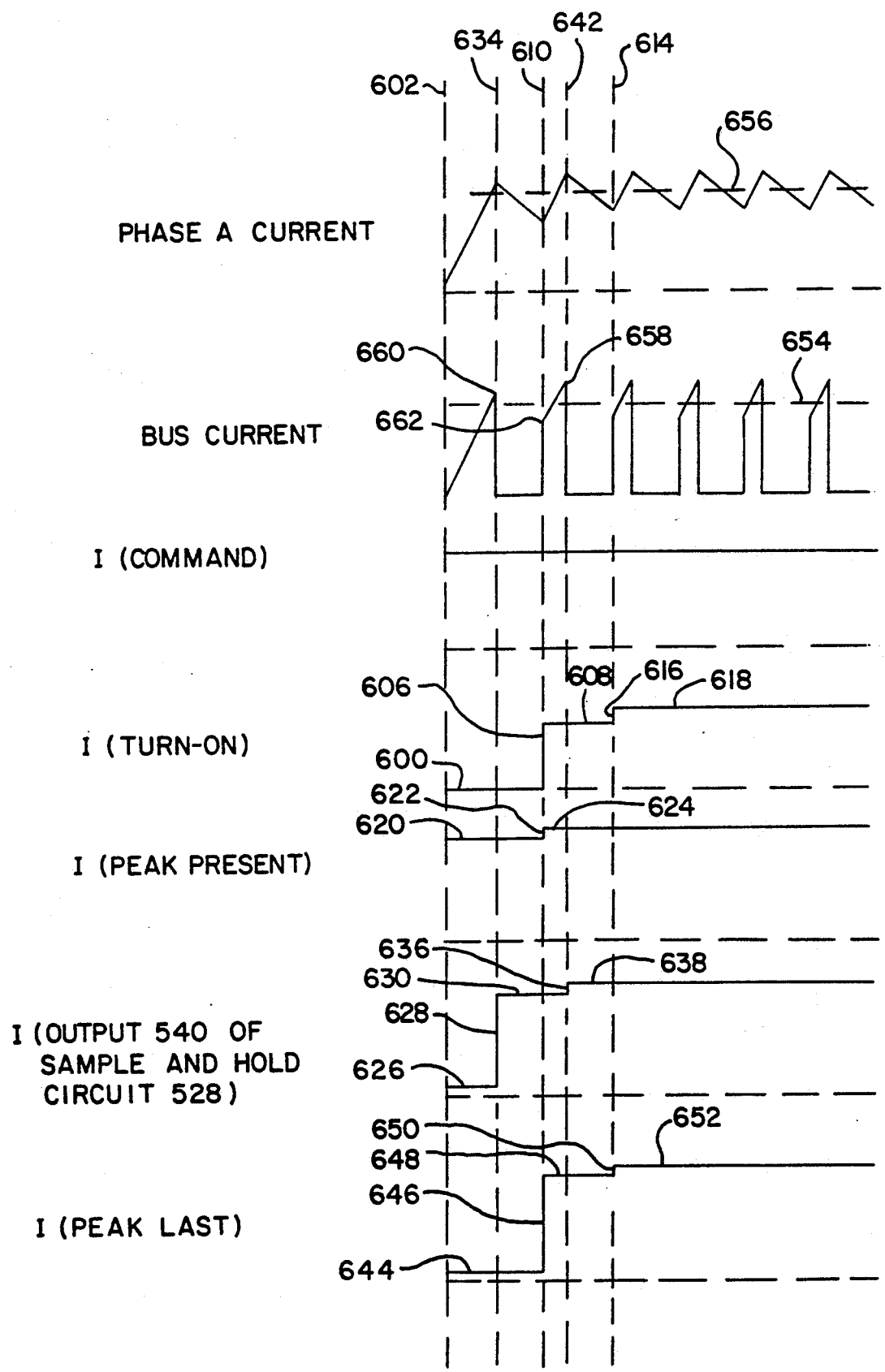

FIG. 28 is a waveform diagram further illustrating operation of the present invention.

DETAILED DESCRIPTION

Parent Applications

Figure 1:
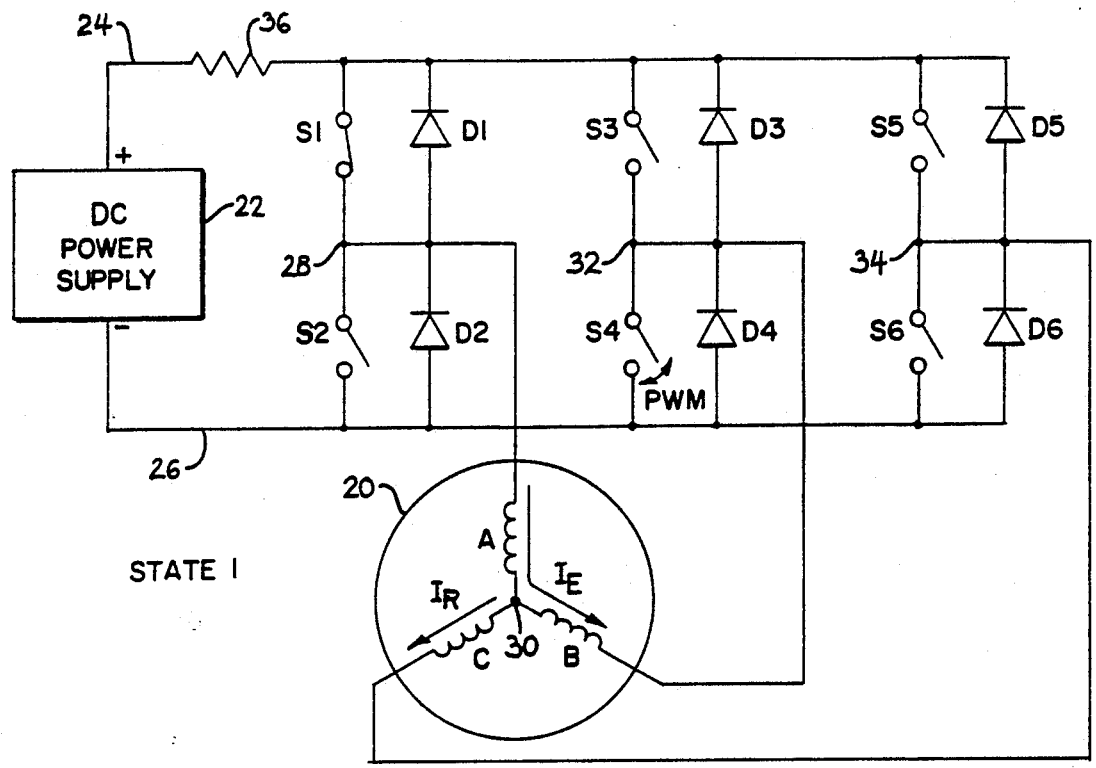
FIG. 1 schematically illustrates circuitry for carrying out the control method in accordance with the invention in application Ser. No. 07/389,874, and shows a first energization state.
Figure 2:
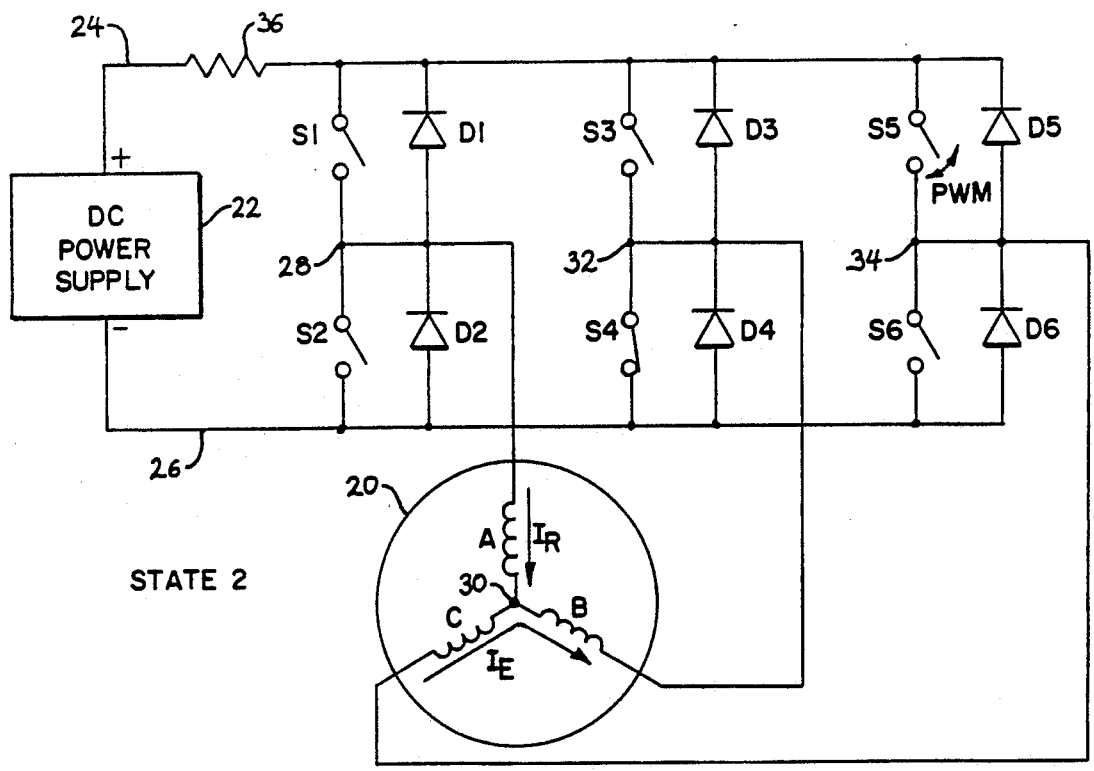
FIG. 2 is like FIG. 1 and shows a second energization state.
Figure 3:
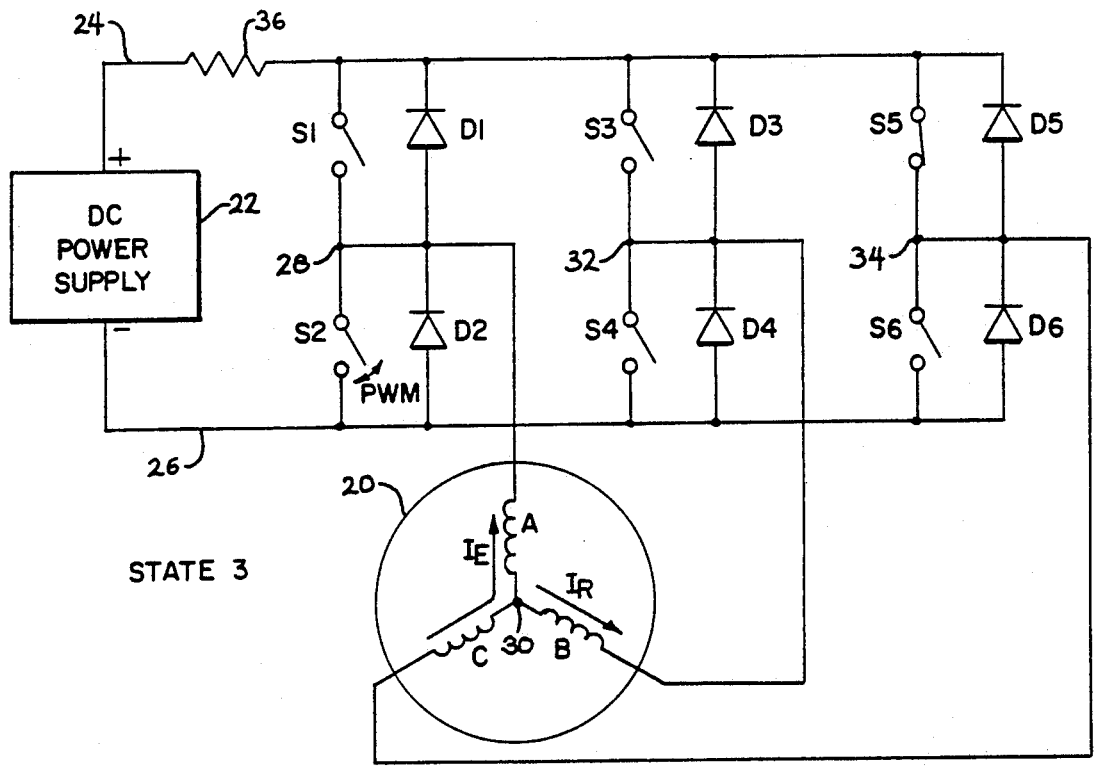
FIG. 3 is like FIG. 1 and shows a third energization state.
Figure 4:
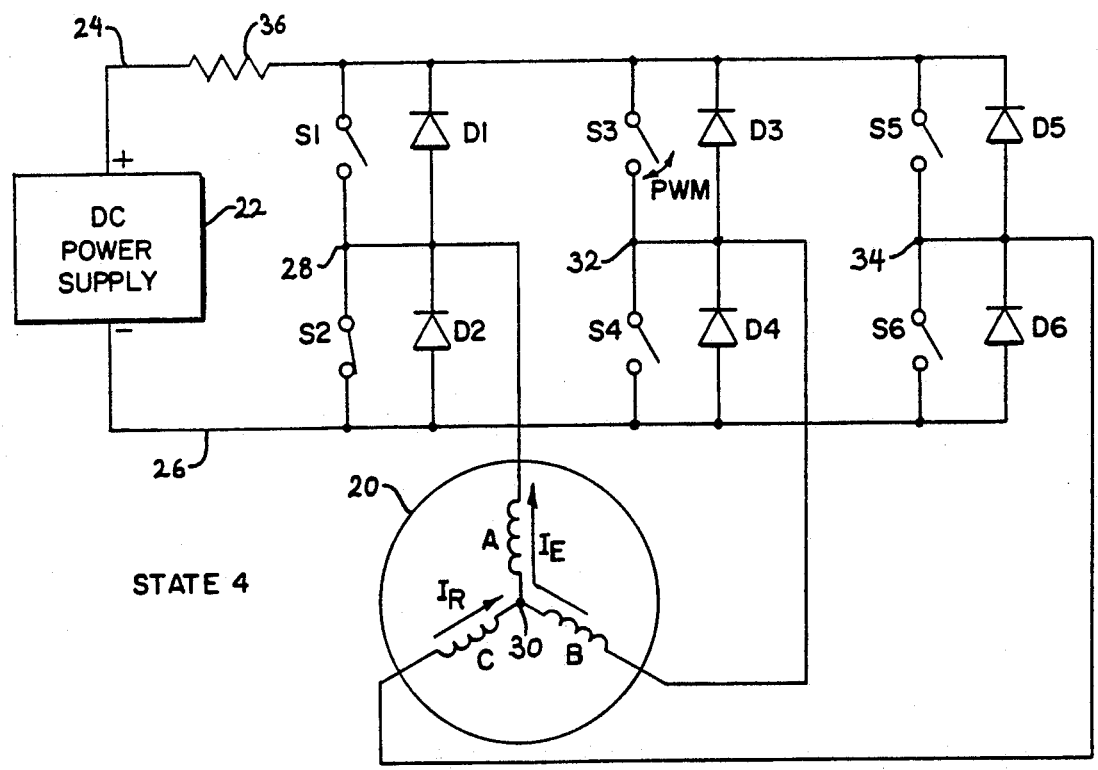
FIG. 4 is like FIG. 1 and shows a fourth energization state.
Figure 5:
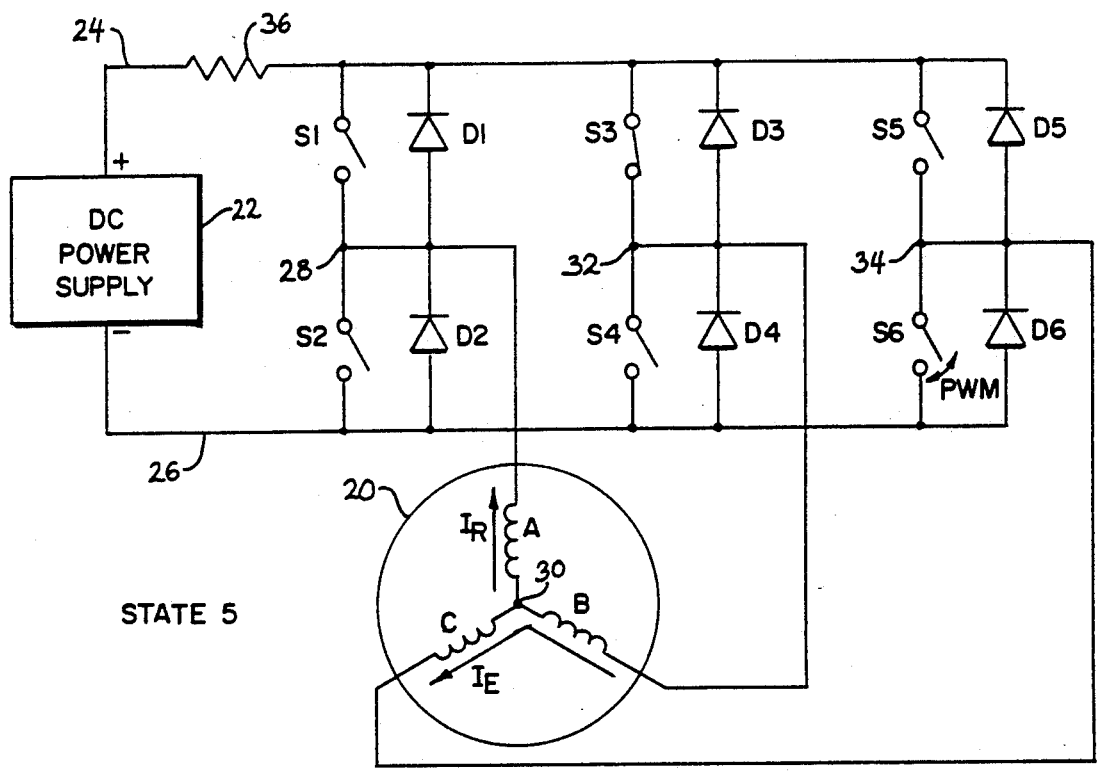
FIG. 5 is like FIG. 1 and shows a fifth energization state.
Figure 6:
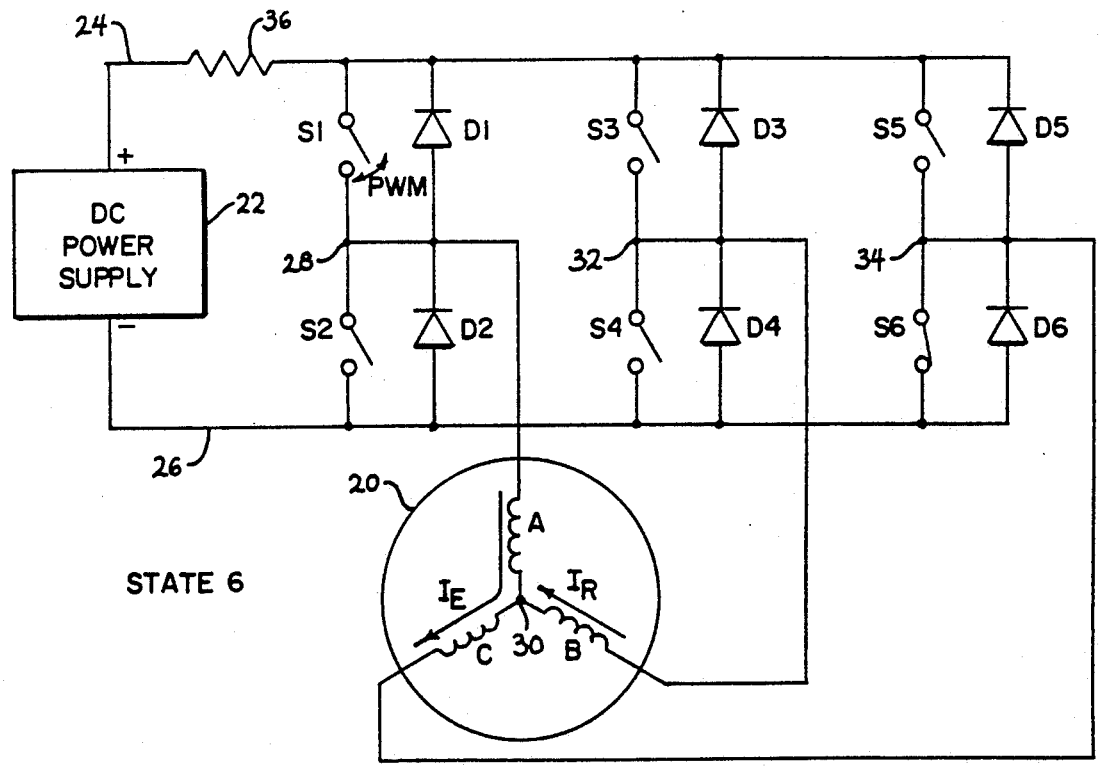
FIG. 6 is like FIG. 1 and shows a sixth energization state.

FIG. 1 shows an electric motor 20 comprising three phases A, B and C. The motor phase windings are energized through switches S1, S2, S3, S4, S5, and S6 from a DC power supply 22, which may be a rectified and filtered AC source (not shown). Switches S1, S3 and S5 are connected to positive DC bus terminal 24. Switches S2, S4 and S6 are connected to negative DC bus terminal 26. Diodes D1, D2, D3, D4, D5 and D6 are connected in reverse parallel with respective switches S1-S6. The phase A winding has one end connected to a node 28 between switches S1 and S2, and another end connected to a common phase node 30. The phase B winding has one end connected to a node 32 between switches S3 and S4, and another end connected to common phase node 30. The phase C winding has one end connected to a node 34 between switches S5 and S6, and another end connected to common phase node 30.

In energization state 1, switch S1 is closed, and switch S4 is pulse width modulated between on and off conditions to regulate a constant current through motor phases A and B, as shown at energization current $I_E$. At initiation of this state, switch S4 is closed until the current, for example as sensed by bus current sensing resistor 36, rises to a given level, and then switch S4 is opened for an off interval, during which bus current decreases, and at the end of such interval, switch S4 is again closed until the sensed bus current again rises to the noted given level, whereupon switch S4 is opened, and so on. In this manner, a constant current, at least within a given range in a sawtooth current waveform, is regulated through the motor. Pulse width modulation for constant motor current regulation is known in the art.

Regeneration current in the unenergized phase, for example phase C in state 1, FIG. 1, is sensed, and the drive is commutated to the next state. This regeneration current is shown at $I_R$ in FIG. 1, and indicates that the rotor field has moved past its alignment position with the stator, and that the motor is starting to regenerate current through phase C. Periodically during state 1, all switches S1-S6 are turned off for a blanking interval. During this blanking interval, current continues to flow through phase windings A and B due to their inductance. This inductive current continues to flow in the same direction as energization current $I_E$, and hence flows from phase winding B through diode D3, through bus terminal 24 to DC source 22 and is returned through bus terminal 26 through diode D2 and back to phase winding A. If there is no regeneration current in phase winding C, then the inductive current through phase windings A and B as flowing leftwardly through current sensing resistor 36 will be the same but opposite in polarity to the energization current flowing rightwardly through current sensing resistor 36 during the on states of switches S1 and S4. Thus, during the noted blanking interval of switches S1-S6 during state 1, the inductive current will be equal to but opposite in polarity to the energization current when switches S1 and S4 are on.

If, however, during the blanking interval of switches S1-S6, the rotor field has moved past its alignment position, and the motor is regenerating current, then regeneration current $I_R$ will appear in phase winding C. This regeneration current $I_R$ flows from phase winding C through diode D5 leftwardly through current sensing resistor 36 and bus terminal 24 to DC power supply 22 and is returned through bus terminal 26 and diode D2 and phase winding A to phase winding C. This regeneration current $I_R$ adds an extra current component in the leftward current flow through current sensing resistor 36. Hence, the sum of such regeneration current $I_R$ and the noted inductive current is greater than the noted energization current $I_E$. That is, during state 1, with switches S1 and S4 closed, energization current $I_E$ flows rightwardly through bus terminal 24 and current sensing resistor 36, through switch S1, through the phase A winding, through the phase B winding, through switch S4 and through bus terminal 26 back to DC power supply 22. This is the noted energization current $I_E$.

During the noted blanking interval, with all switches S1–S6 open, and assuming the rotor has moved past its optimum alignment position, there is both inductive current and regeneration current flowing leftwardly through current sensing resistor 36 and bus terminal 24, the sum of which is greater than the noted energization current $I_E$. The regeneration current $I_R$ provides the additional current component.

In state 1, the method in the noted parent application senses bus current flow rightwardly through bus conductor 24 and current sensing resistor 36, through switch S1, through the phase A winding, through the phase B winding, through switch S4 to bus conductor 26. During the blanking interval in state 1, with all switches S1–S6 open, the opposite direction of bus current flow is sensed from bus conductor 26 through diode D2, through the phase A winding due to inductance of the latter, through the phase B winding due to inductance of the latter, through diode D3 and leftwardly through current sensing resistor 36 and bus conductor 24, plus regeneration current through the phase C winding and diode D5 leftwardly through current sensing resistor 36 and bus conductor 24, to cumulatively sense on the DC bus the inductive current in phases A and B and the regeneration current in phase C. The motor is commutated to state 2 when the sum of the inductive current in phases A and B flowing leftwardly through bus conductor 24 and the regeneration current in phase C flowing leftwardly through bus conductor 24 is greater than the energization current for phases A and B flowing rightwardly through bus conductor 24.

In state 1, phases A and B are energized. Regeneration current in phase C is sensed, and the motor is commutated to state 2 in response to such regeneration current.

In state 2, phase C is energized in the opposite polarity as regeneration current $I_R$ in state 1. Phase B is energized in the same polarity as energization current $I_E$ in state 1. Regeneration current $I_R$ in phase A is sensed in the same polarity as energization current $I_E$ in state 1. The motor is commutated to state 3 in response to this last noted regeneration current $I_R$.

In state 3, phase A is energized in the opposite polarity as regeneration current $I_R$ in state 2, and in the opposite polarity as energization current $I_E$ in state 1. Phase C is energized in the same polarity as energization current $I_E$ in state 2. Regeneration current $I_R$ in phase B is sensed in the same polarity as energization current $I_E$ in state 2. The motor is commutated to state 4 in response to this last noted regeneration current $I_R$.

In state 4, phase B is energized in the opposite polarity as regeneration current $I_R$ in state 3 in state 2. Phase A is energized in the same polarity as energization current $I_E$ in state 3. Regeneration current $I_R$ in phase C is sensed in the same polarity as energization current $I_E$ in state 3. The motor is commutated to state 5 in response to this last noted regeneration current $I_R$.

In state 5, phase C is energized in the opposite polarity as regeneration current $I_R$ in state 4, and in the opposite polarity as energization current $I_E$ in state 3. Phase B is energized in the same polarity as energization current $I_E$ in state 4. Regeneration current $I_R$ in phase A is sensed in the same polarity as energization current $I_E$ in state 4. The motor is commutated to state 6 in response to this last noted regeneration current $I_R$.

In state 6, phase A is energized in the opposite polarity as regeneration current $I_R$ in state 5, and in the opposite polarity as energization current $I_E$ in state 4. Phase C is energized in the same polarity as energization current $I_E$ in state 5. Regeneration current $I_R$ in phase B is sensed in the same polarity as energization current $I_E$ in state 5. The motor is commutated to state 1 in response to this last noted regeneration current $I_R$.

In state 1, phase B is energized in the opposite polarity as regeneration current $I_R$ in state 6, and in the opposite polarity as energization current $I_E$ in state 5. Phase A is energized in the same polarity as energization current $I_E$ in state 6. Regeneration current $I_R$ in phase C is sensed in the same polarity as energization current $I_E$ in state 6. The motor is commutated to state 2 in response to this last mentioned regeneration current $I_R$, and so on to repeat the cycle.

In state 1, switch S1 is turned on, and switch S4 is pulse width modulated between on and off conditions to provide the above noted constant current regulation. In state 2, switch S4 is turned on, and switch S5 is pulse width modulated between on and off conditions to provide constant current regulation. In state 3, switch S5 is turned on, and switch S2 is pulse width modulated between on and off conditions to provide constant current regulation. In state 4, switch S2 is turned on, and switch S3 is pulse width modulated between on and off conditions to provide constant current regulation. In state 5, switch S3 is turned on, and switch S6 is pulse width modulated between on and off conditions to provide constant current regulation. In state 6, switch S6 is turned on, and switch S1 is pulse width modulated between on and off conditions to provide constant current regulation. All switches S1–S6 are turned off simultaneously for the noted blanking interval at least once in each of the six states. Regeneration current is sensed during such blanking interval in each of the six states.

In state 1, regeneration current in phase C is sensed by sensing current through diode D5. In state 2, regeneration current in phase A is sensed by sensing current through diode D2. In state 3, regeneration current in phase B is sensed by sensing current through diode D3. In state 4, regeneration current in phase C is sensed by sensing current through diode D6. In state 5, regeneration current in phase A is sensed by sensing current through diode D1. In state 6, regeneration current in phase B is sensed by sensing current through diode D4.

As noted above, in state 1, rightward bus current flow in bus conductor 24 is sensed by sensing current flow from bus conductor 24 through switch S1, through the phase A winding, through the phase B winding, through switch S4 to bus conductor 26. During the blanking interval of switches S1–S6 in state 1, leftward bus current flow through bus conductor 24 is sensed by sensing bus current flow from bus conductor 26 through diode D2, through the phase A winding due to inductance of the latter, through the phase B winding due to inductance of the latter, through diode D3 to bus conductor 24, plus regeneration current through the phase C winding and diode D5 to bus conductor 24, to cummulatively sense on the bus the inductive current in phases A and B and the regeneration current in phase C. The motor is commutated to state 2 in response to a given differential between energization current $I_E$ rightwardly on bus conductor 24 and the sum of inductive current and regeneration current $I_R$ leftwardly on bus conductor 24, preferably when the noted latter sum is greater than the noted energization current $I_E$.

In state 2, energization current $I_E$ rightwardly on bus conductor 24 is sensed from bus conductor 24 through switch S5, through the phase C winding, through the phase B winding, through switch S4 to bus conductor 26. During the blanking interval of switches S1–S6 in state 2, leftward bus current flow through bus conductor 24 is sensed by sensing bus current flow from bus conductor 26 through diode D6, through the phase C winding due to inductance of the latter, through the phase B winding due to inductance of the latter, through diode D3 to bus conductor 24, plus regeneration current $I_R$ from bus conductor 26 through diode D2 and the phase A winding, to cumulatively sense on the bus the inductive current from phases C and B and the regeneration current $I_R$ from phase A. The motor is commutated to state 3 in response to a given differential between the last noted energization current $I_E$ in the rightward direction on bus conductor 24 and the last mentioned sum of the inductive current and regeneration current $I_R$ in the leftward direction on bus conductor 24.

In state 3, bus current flow in the rightward direction on bus conductor 24 is sensed by sensing current flow from bus conductor 24 through switch S5, through the phase C winding, through the phase A winding, through switch S2 to bus conductor 26. During the blanking interval of switches S1–S6 in state 3, the leftward direction of bus current flow on bus conductor 24 is sensed by sensing current flow from bus conductor 26 through diode D6, through the phase C winding due to inductance of the latter, through the phase A winding due to inductance of the latter, through diode D1 to bus conductor 24, plus regeneration current $I_R$ through the phase B winding and diode D3 to bus conductor 24, to cumulatively sense on the bus the inductive current from phases C and A and the regeneration current $I_R$ from phase B. The motor is commutated to state 4 in response to a given differential between the last noted energization current $I_E$ in the rightward direction on bus conductor 24 and the last noted sum of inductive current and regeneration current $I_R$ in the leftward direction on bus conductor 24, preferably when said sum exceeds said energization current.

In state 4, bus current flow rightwardly in bus conductor 24 is sensed by sensing current flow from bus conductor 24 through switch S3, through the phase B winding, through the phase A winding, through switch S2 to bus conductor 26. During the blanking interval of switches S1–S6 in state 4, the leftward direction of bus current flow on bus conductor 24 is sensed by sensing current flow from bus conductor 26 through diode D4, through the phase B winding due to inductance of the latter, through the phase A winding due to inductance of the latter, through diode D1 to bus conductor 24, plus regeneration current $I_R$ from bus to cumulatively sense on the bus the inductive current in phases A and B and the regeneration current $I_R$ in phase C. The motor is commutated to state 5 in response to a given differential between the last noted energization current $I_E$ in the rightward direction on bus conductor 24 and the last noted sum of inductive current and regeneration current $I_R$ in the leftward direction on bus conductor 24, and preferably when the last noted sum is greater than the last noted energization current $I_E$.

In state 5, the rightward direction of current flow on bus conductor 24 is sensed by sensing current flow from bus conductor 24 through switch S3, through the phase B winding, through the phase C winding, through switch S6 to bus conductor 26. During the blanking interval of switches S1–S6 in state 5, the leftward direction of bus current flow in bus conductor 24 is sensed by sensing current flow from bus conductor 26 through diode D4, through the phase B winding due to inductance of the latter, through the phase C winding due to inductance of the latter, through diode D5 to bus conductor 24, plus regeneration current through the phase A winding and diode D1 to bus conductor 24, to cumulatively sense on bus conductor 24 the inductive current in phases B and C and the regeneration current $I_R$ in phase A. The motor is commutated to state 6 in response to a given differential between the last noted energization current $I_E$ in the rightward direction on bus conductor 24 and the last mentioned sum of inductive current and regeneration current $I_R$ in the leftward direction on bus conductor 24, preferably when the last noted sum is greater than the last noted energization current $I_E$.

In state 6, the rightward direction of bus current flow on bus conductor 24 is sensed by sensing current flow from bus conductor 24 through switch S1, through the phase A winding, through the phase C winding, through switch S6 to bus conductor 26. During the blanking interval of switches S1–S6 in state 6, the leftward direction of bus current flow on bus conductor 24 is sensed by sensing current flow from bus conductor 26 through diode D2, through the phase A winding due to inductance of the latter, through the phase C winding due to inductance of the latter, through diode D5 to bus conductor 24, plus regeneration $I_R$ from bus conductor 26 through diode D4 and the phase B winding, to cumulatively sense on bus conductor 24 the inductive current in phases A and C and the regeneration current $I_R$ in phase B. The motor is commutated to state 1 in response to a given differential between the last noted energization current $I_E$ in the rightward direction on bus conductor 24 and the last noted sum of inductive current and regeneration current $I_R$ in the leftward direction on bus conductor 24, preferably when the last noted sum is greater than the last noted energization current $I_E$.

The control method thus includes energizing the phases in a cyclic sequence comprising a plurality of states, wherein during each state, two of the phases are energized and the third phase is unenergized, sensing regeneration current from the unenergized phase, and commutating to the next state in response to the regeneration current. The method further includes, in the next state, energizing the unenergized phase of the present state in a polarity opposing the regeneration current of the present state, such that during the next state, energization current is directed in the last noted phase in a direction opposite to the regeneration current of the present state. The method further includes, in the state prior to the present state, energizing the unenergized phase of the present state in a polarity aiding the regeneration current of the present state, such that during the prior state, energization current is directed in the last mentioned phase in the same direction as the regeneration current of the present state. In the preferred embodiment, all of the commutation switches, such as S1–S6, are simultaneously turned off for a given blanking interval, and the regeneration current is sensed during such blanking interval. Such regeneration current is sensed by sensing current conduction through the noted reverse diodes D1–D6. One direction of bus current flow is sensed providing energization current supplied through the commutation switches to the two energized phases in the present state. The opposite direction of bus current flow from all three phases through the diodes is sensed during the noted blanking interval of the switches, to cumulatively sense on the bus the inductive current from the energized phases of the present state and the regeneration current from the unenergized phase of the present state. The motor is commutated to the next state in response to a given differential between the energization current in the one direction on the bus and the sum of the inductive current and regeneration current in the opposite direction on the bus. In the preferred embodiment, the motor is commutated to the next state when the sum of the inductive current and regeneration current in the opposite direction on the bus exceeds the energization current in the one direction on the bus. In an alternate embodiment, individual phase current sensors may be provided for sensing regeneration conduction current through the respective diodes.

Figure 7:
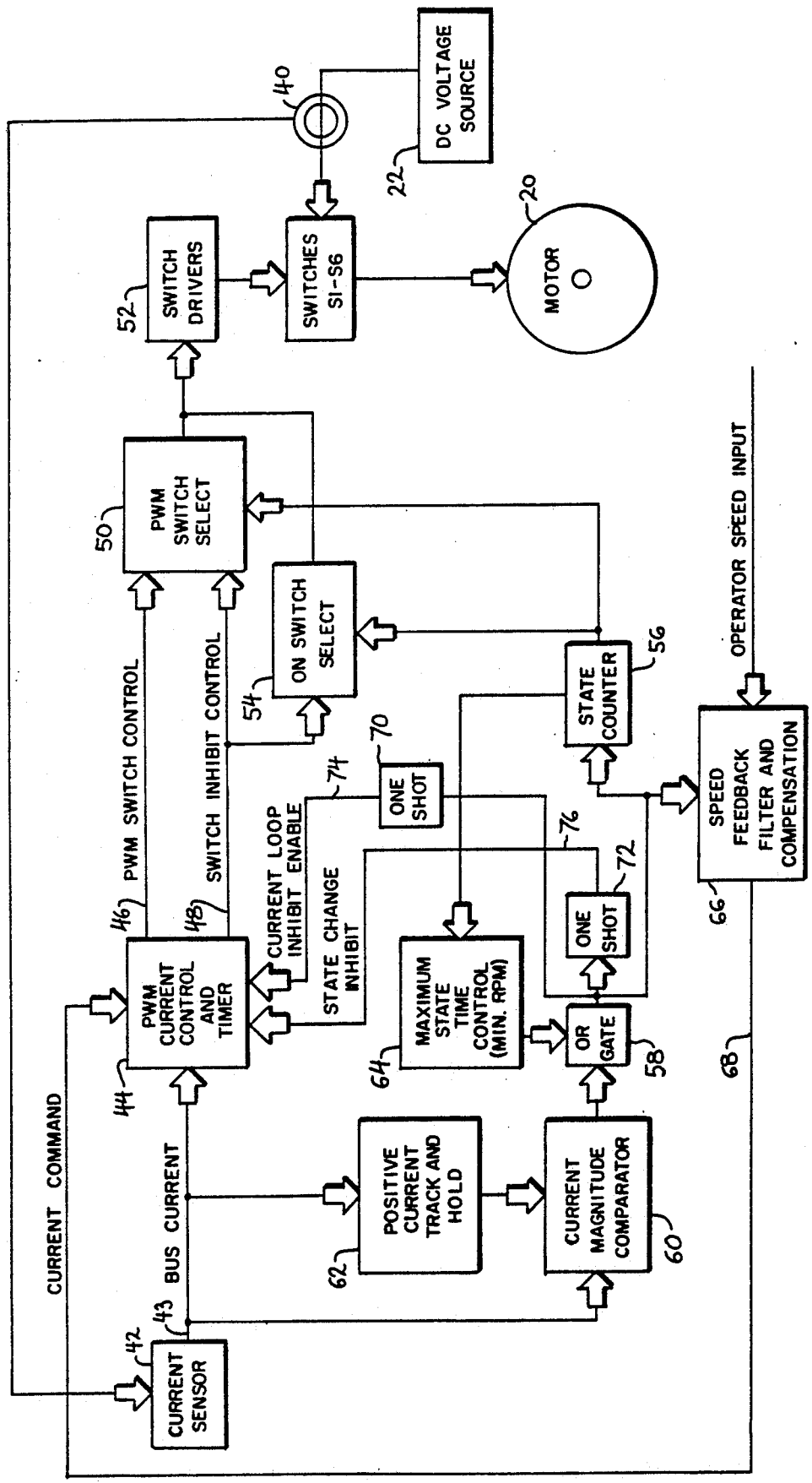
FIG. 7 shows control circuitry in accordance with the invention in application Ser. No. 07/389,874.

FIG. 7 illustrates circuitry for carrying out the above method, and like reference numerals are used from FIGS. 1–6 where appropriate to facilitate understanding. DC voltage source 22 supplies energization current through commutation switches S1-S6 to motor 20. Bus current sensing may be provided by a series resistor as shown at 36 in FIGS. 1–6, or by an annular coil 40 around bus conductor 24 connected to a sensor 42. Various other types of current sensors may of course be used. Sensor 42 amplifies the signal from coil 40 and provides a sensed bus current signal at output 43 which is input to a PWM current control and timer circuit 44 providing timing signals at outputs 46 and 48. Output 46 provides timing pulses going high and low, and provides the above noted pulse width modulation constant current control. Output 48 provides a series of high and low timing pulses providing the above noted blanking interval for checking current regeneration.

PWM switch select circuit 50 is a multiplexer and selects which of the switch drivers 52 is to be pulse width modulated, which in turn pulse width modulates one of switches S1-S6. Switch drivers 52 are the amplifying and the gate drive circuitry for switches S1-S6, such as FETs or other semiconductor switches. On switch select circuit 54 is a multiplexer and selects one of the switch drivers 52 and its corresponding switch S1-S6 which is to be energized to an on condition. State counter 56 stores the cyclic sequence for energizing the phases in a plurality of states, and controls multiplexers 50 and 54 to select the switch to be pulse width modulated and the switch to be turned on continuously during the chosen state. For example, during state 1, state counter 56 commands PWM switch select multiplexer 50 to chose switch S4, and commands on switch select multiplexer 54 to choose switch S1. During state 2, state counter 56 commands PWM switch select multiplexer 50 to choose switch S5, and commands on switch select multiplexer 54 to choose switch S4, and so on for the remaining of the six states. The timing signal at output 48 of timer 44 provides a switch inhibit control to disable the output signals from multiplexers 50 and 54, such that all switches S1-S6 are off during the noted blanking interval.

State counter 56 is incremented from one state to the next by OR gate 58. One of the inputs to OR gate 58 is provided by current comparator 60. Output 43 of bus current sensor 42 is provided to current comparator 60, and is also provided to positive current track and hold circuit 62. Comparator 60 compares the above noted energization current $I_E$ from circuit 62 against the above noted sum of inductive current and regeneration current. When such sum exceeds the energization current $I_E$, the output of comparator 60 goes high which in turn causes the output of OR gate 58 to go high, which in turn increments state counter 56 to the next state, e.g. from state 1 to state 2, or from state 2 to state 3, etc. The other input to OR gate 58 is provided by a maximum state time control circuit 64. If a high output from current comparator 60 is not received within a given time interval, then state timer 64 provides a high signal to OR gate 58, such that the latter provides a high signal to state counter 56 to increment the latter to the next state, to provide a minimum motor speed. Timer 64 is reset upon commutation to the next state by state counter 56. Speed feedback filter and compensation circuit 66 enables operator speed input. Circuit 66 compares the desired speed as set by the operator with the frequency of transitions of the output of OR gate 58, and provides a current command signal at output 68 which is input to PWM timer 44. OR gate 58 also triggers one shot multivibrators 70 and 72 with respective outputs 74 and 76 providing a current loop inhibit enable signal and a state change inhibit signal, respectively, to be described, which are input to PWM timer 44.

Figure 8:
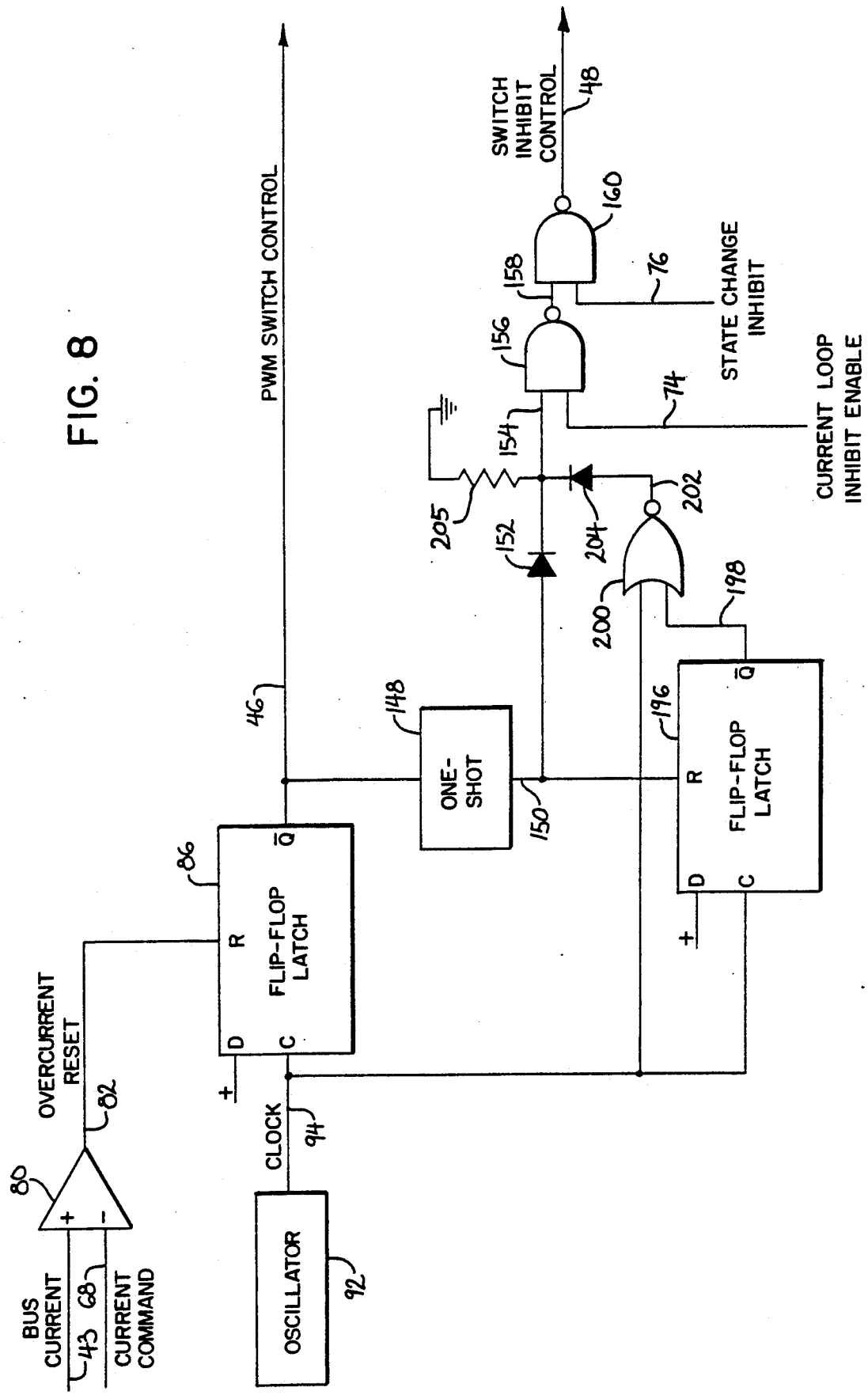
FIG. 8 is a circuit diagram showing in further detail a portion of the circuitry of FIG. 7.

FIG. 8 shows the circuitry of PWM current control and timer 44 of FIG. 7. The sensed bus current signal on line 43 is compared against the current command signal on line 68 by comparator 80 having an output 82. When the bus current signal on line 43 reaches or exceeds the current command signal on line 68, comparator output 82 goes high, as shown at positive going transition 84 in FIG. 9. Comparator output 82 is connected to the reset input of a flip flop latch 86, provided by a 4013 flip flop. The high state on line 82 resets flip flop 86 such that the latters $\bar{Q}$ output goes high, as shown at transition 88, FIG. 9. The $\bar{Q}$ output of flip flop 86 provides the PWM switch control signal on line 46. The high state of the PWM switch control signal on line 46 disables the power switch, S1-S6, then selected by multiplexer 50, such that the power switch is off. During this off interval, bus current decreases, and hence the bus current signal on line 43 drops below the current command signal on line 68, such that the overcurrent reset signal at output 82 of comparator 80 goes low, as shown at transition 90, FIG. 9.

An oscillator 92 provides clock pulses of a given frequency at output 94 which is connected to the clock input of flip flop 86. The next positive going clock pulse transition 96, FIG. 9, clocks flip flop 86 such that the latters $\bar{Q}$ output on line 46 goes low, as shown at transition 98. The low state on line 46 enables the power switch, S1-S6, selected by multiplexer 50, such that the power switch turns back on. Bus current thus increases, as shown at segment 100 in FIG. 10 after clock pulse transition 96.

The next positive going clock pulse transition 102 occurs before the bus current signal on line 43 rises above the current command signal on line 68. Hence, there is no overcurrent reset pulse on line 82 between clock pulse edges 96 and 102, and hence the PWM switch control signal on line 46 remains low during such interval. This in turn means that the selected power switch remains on, and bus current continues to rise. Positive going clock pulse transition 102 reclocks flip flop 86, and the $\bar{Q}$ output on line 46 remains low.

Figure 9:
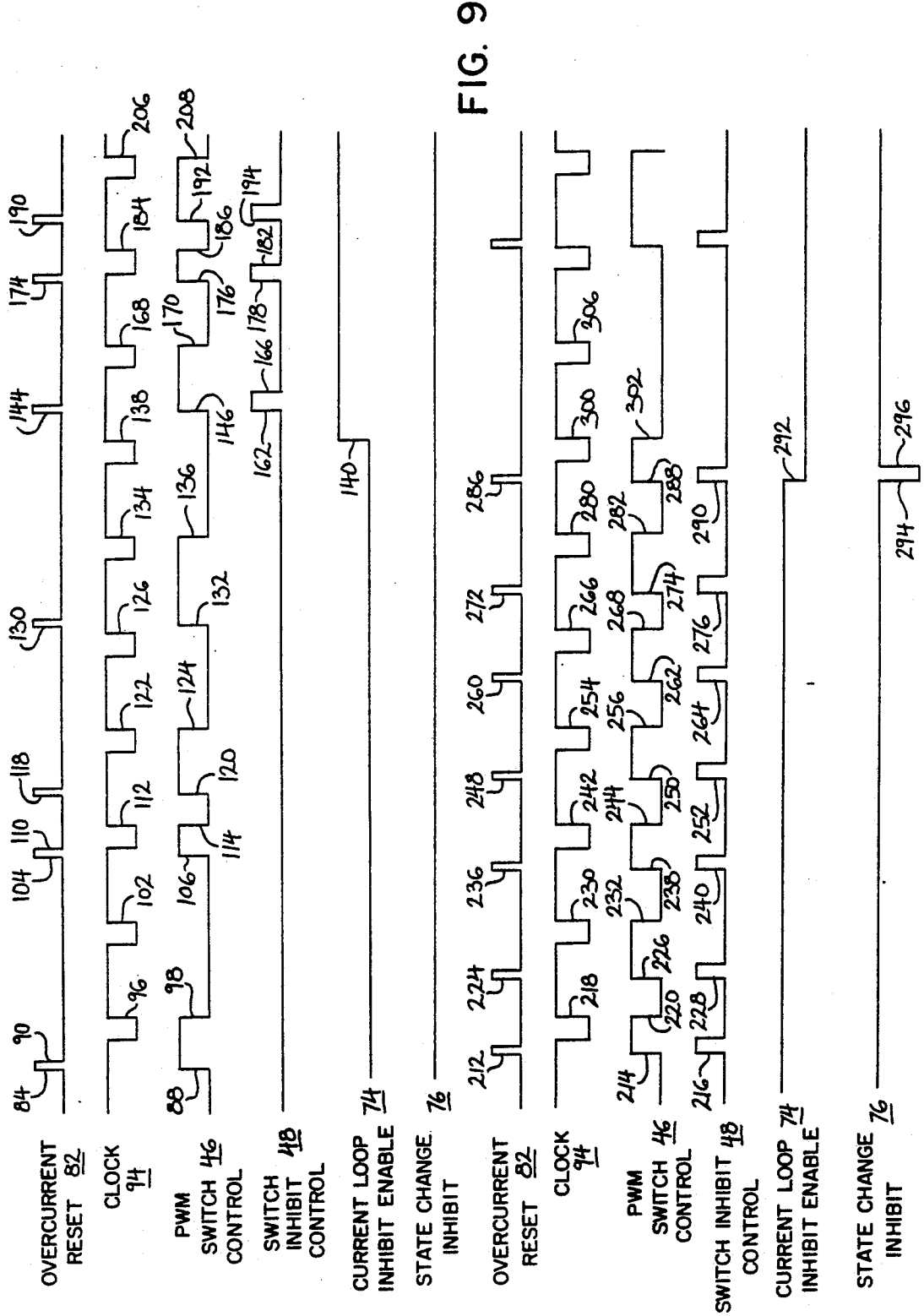
FIG. 9 is a timing diagram illustrating operation of the circuitry of FIGS. 7 and 8.
Figure 10:
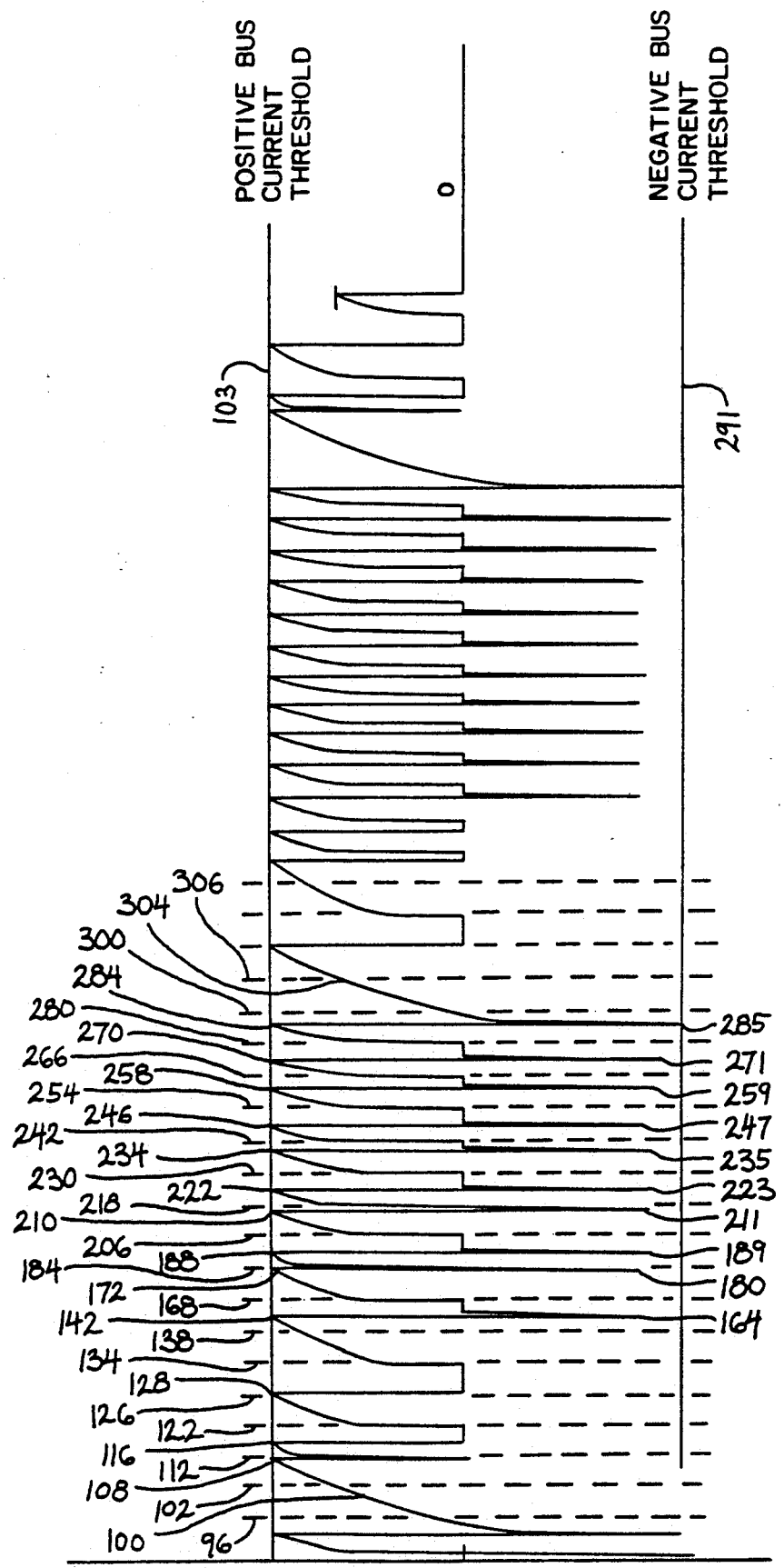
FIG. 10 is a current waveform diagram showing the current resulting from operation of the circuitry of FIGS. 7 and 8.
Figure 11:
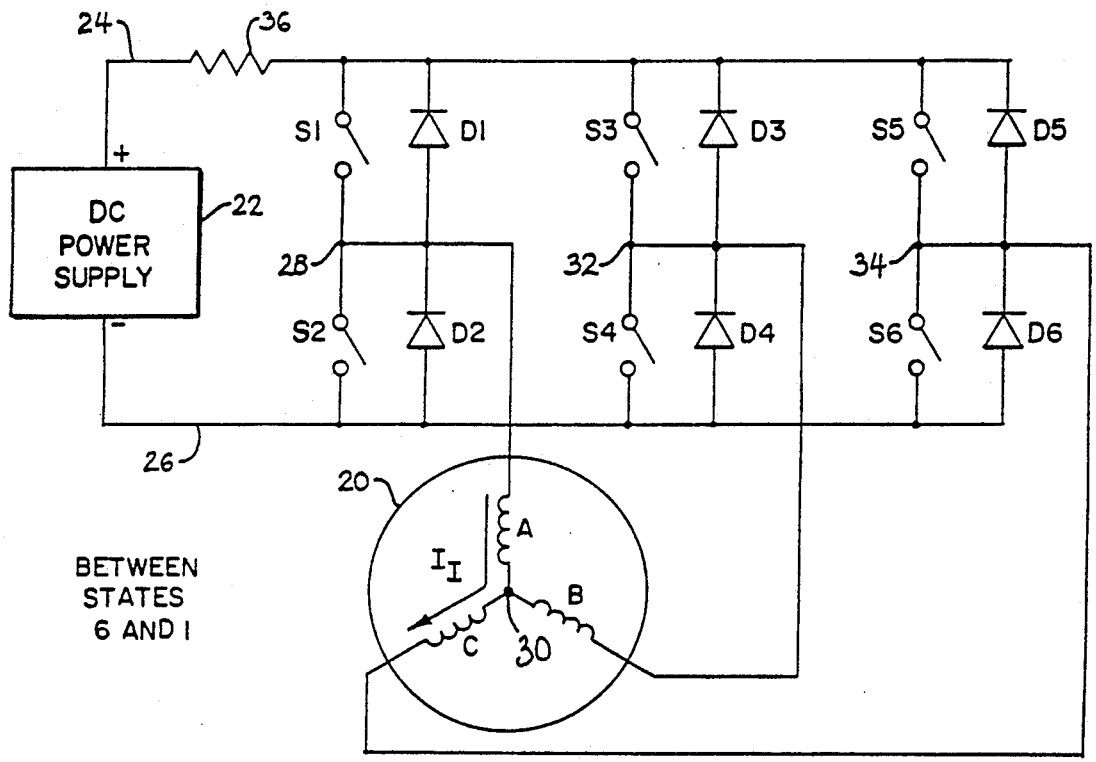
FIG. 11 is like FIG. 1 and shows a condition in accordance with the invention in application Ser. No. 07/400,467 between the sixth and first

After clock pulse edge 102, the bus current signal continues to rise and reaches a given threshold 103, FIG. 10, i.e. the bus current signal on line 43 reaches the current command signal on line 68. Comparator output 82 then transitions high at 104, FIG. 9, to provide an overcurrent reset signal which resets flip flop 86, such that the latter's $\overline{Q}$ output on line 46 transitions high at 106, which in turn disables the selected power switch such that the latter turns off. FIG. 10 shows the bus current signal peak at point 108 reaching threshold 103, at which time PWM switch control signal transition 106 turns off the power switch, and the bus current decreases as shown immediately following point 108.

When the bus current decreases, the bus current signal on line 43 drops below the current command signal on line 68, and comparator output 82 again goes low as shown at transition 110. The next positive going clock pulse transition 112 clocks flip flop 86 such that the latter's $\overline{Q}$ output on line 46 goes low, as shown at transition 114. The low state on line 46 again turns on the power switch, such that bus current again begins to rise. The bus current signal rises to a peak at point 116, FIG. 10, at threshold 103, whereupon an overcurrent reset pulse on comparator output line 82 is generated, transition 118, which resets flip flop 86 such that the latter's $\overline{Q}$ output on line 46 transitions high at 120. The high state on line 46 turns off the power switch, such that bus current decreases. The next positive going clock pulse transition 122 clocks flip flop 86 such that the latter's $\overline{Q}$ output on line 46 transitions low at 124 which turns the power switch back on, such that bus current again begins to rise. The next positive going clock pulse transition 126 occurs just before an overcurrent reset pulse and re-clocks flip flop 86 such that the latter's $\overline{Q}$ output on line 46 remains low and the power switch remains on such that bus current continues to rise. The bus current signal rises to a peak at point 128 at threshold 103, whereupon comparator output 82 transitions high at 130 to provide an overcurrent reset pulse resetting flip flop 86 such that the latter's $\overline{Q}$ output transitions high at 132, which turns off the power switch, such that bus current decreases. The next positive going clock pulse transition 134 clocks flip flop 86 such that the latter's $\overline{Q}$ output on line 46 transitions low at 136, which turns the power switch back on, such that bus current again increases. The next positive going clock pulse transition 138 re-clocks flip flop 86, without an intermediate overcurrent reset pulse on line 82, such that the $\overline{Q}$ output on line 46 remains low, and the power switch remains on, such that bus current continues to rise.

One shot multivibrator 70, FIG. 7, is triggered by OR gate 58 to generate a low signal on output 74 of given timed duration. This low pulse on line 74 times out or ends at positive going transition 140 in FIG. 9, to be further described. After positive going clock pulse transition 138, FIG. 9 and 10, the bus current signal rises to a peak at point 142 at threshold 103, such that comparator output 82 transitions high at 144. The high state on line 82 resets flip flop 86 such that the latter's $\overline{Q}$ output on line 46 transitions high at 146. The high state on line 46 turns off the power switch, such that bus current decreases. The transition to a high state on line 46 also triggers a one shot multivibrator 148, FIG. 8, having an output 150 connected through diode 152 to input 154 of NAND gate 156. The other input of NAND gate 156 is provided by the current loop inhibit enable signal on line 74 from one shot multivibrator 70. The output 158 of NAND gate 156 provides one of the inputs to NAND gate 160. The other input to NAND gate 160 is provided by the state change inhibit signal on line 76 from one shot multivibrator 72. The output of NAND gate 160 is the switch inhibit control signal on line 48.

In response to the positive going transition 146 on line 46, one shot multivibrator 148 outputs a positive pulse at output 150 of given duration. The high state at output 150 is supplied through diode 152 to NAND gate input 154. The other input on line 74 to NAND gate 156 is also high after transition 140, such that the output of NAND gate 156 on line 158 is low. This low state causes the output of NAND gate 160 on line 48 to go high, as shown at transition 162. The positive pulse on line 48 provides a blanking pulse providing the above noted blanking interval. A high signal on line 48 disables the power switches chosen by multiplexers 50 and 54, such that bus current decreases, and there will be a negative bus current as shown at 164, FIG. 10, meaning that current is flowing back leftwardly through resistor 36 in FIG. 1, or such other bus current sensor.

At the end of the positive current pulse from one shot multivibrator 148, output 150 goes low, whereby NAND gate input 154 goes low, and NAND gate output 158 goes high. The high state on line 158 together with the high state on line 76 causes the output of NAND gate 160 on line 48 to transition low at 166, terminating the blanking interval. Comparator 60, FIG. 7, compares the maximum positive bus current signal from circuit 62, i.e. the above noted energization current $I_E$, against the bus current signal on line 43 during the blanking interval between transitions 162 and 166, i.e. the above noted inductive current plus regeneration current if present. In FIG. 10, the absolute value of this latter sum of inductive current and regeneration current at peak 164 does not exceed the energization current in the other direction at peak 142, and hence there is no triggering of OR gate 58 by comparator 60.

The next positive going clock pulse transition 168, FIG. 9, clocks flip flop 196 and flip flop 86 such that the latter's $\overline{Q}$ output on line 46 transitions low at 170 to turn the PWM selected power switch back on, such that bus current again increases. The bus current signal rises to peak 172 at threshold 103 prior to the next positive going clock pulse transition, and comparator output 82 transitions high at 174 to reset flip flop 86 such that the latter's $\overline{Q}$ output on line 46 transitions high at 176. The rising edge of the high state on line 46 triggers one shot multivibrator 148 such that the latter's output 150 goes high, which provides a high state at input 154 of NAND gate 156 which in combination with the high state on line 74 at the other input to NAND gate 156 provides a low state at output 158 which causes the output of NAND gate 160 on line 48 to transition high at 178. The high state on line 48 disables the power switches such that the latter are turned off to provide the noted blanking interval during which inductive and regeneration current as shown at negative peak 180, FIG. 10, are checked, as above described. When one shot multivibrator 148 times out, output 150 goes low, which provides a low state at input 154 of NAND gate 156 such that the latter's output 158 goes high which in combination with the high state on line 76 causes the output of NAND gate 160 on line 48 to transition low at 182. Positive going clock pulse transition 184 clocks flip flop 86 such that the latter's $\overline{Q}$ output on line 46 transitions low at 186, which turns the power switches back on, such that bus current again rises. The bus current signal rises to peak 188, FIG. 10, at threshold 103 such that comparator output 82 transitions high at 190 which resets flip flop 86 such that the latter's $\overline{Q}$ output on line 46 transitions high at 192, which turns off the PWM selected power switch. The rising edge of the high state on line 46 also triggers one shot multivibrator 148 such that the latter's output 150 goes high which provides a high state at input 154 to NAND gate 156 which in combination with the high state on line 74 at the other input to the NAND gate causes the output 158 of the NAND gate to go low, which in turn causes the output of NAND gate 160 on line 48 to transition high at 194, to provide the noted blanking interval during which the power switches are off, and inductive current and regeneration current are sensed.

Output 150 of one shot multivibrator 148 is also connected to the reset input of a flip flop latch 196, provided by a 4013 flip flop. The clock input of flip flop latch 196 is connected to line 94. The $\bar{Q}$ output of flip flop latch 196 at line 198 provides one of the inputs to a NOR gate 200. The other input to NOR gate 200 is provided by line 94. The output of NOR gate 200 on line 202 is provided through diode 204 to input 154 of NAND gate 156. Diodes 152 and 204 provide a hard wired OR gate to input 154 of NAND gate 156. The output of the hard wired OR gate is connected through pull-down resistor 205 to ground. When line 46 transitions high, line 150 goes high for the duration of the positive pulse from one shot multivibrator 148. This high state at output 150 provides a high state at NAND gate input 154 until one shot multivibrator 148 times out. The length of the positive pulse from one shot multivibrator 148 is less than the duration of the low portion of the clock cycle 150 resets flip flop latch 196 such that the latter's $\bar{Q}$ output at line 198 goes high, which in turn drives the output of NOR gate 200 at line 202 low. When one shot multivibrator 148 times out, output 150 goes low, which in combination with the low state at line 202 provides a low state at input 154 to NAND gate 156, such that the latters output 158 goes high, which in combination with the high state on line 76 causes the output of NAND gate 160 on line 48 to go low, for example as shown at transition 166 or 182. If current loop inhibit enable line 74 is already low when one shot multivibrator 148 times out, for example as shown in the timing sequences before transition 140, then output 158 of NAND gate 156 is already high, and hence the output of NAND gate 160, assuming line 76 is high, is already low, and remains low, as shown in FIG. 9. The hard wired OR gate provided by diodes 152 and 204 and the interaction of one shot multivibrator 148 and flip flop latch 196 provide a memory function, to be described.

After transition 140 on current loop inhibit enable line 74, there is always a positive pulse on line 48 for each clock pulse cycle, such that there is a blanking interval for each clock pulse cycle, and hence the inductive current and any regeneration current is sensed during each clock pulse cycle following transition 140. At positive going clock pulse transition 206 on line 94, the PWM switch control signal on line 46 transitions low at 208, to turn on the power switch, such that bus current rises. The bus current signal rises to peak 210 at threshold 103, such that comparator 80 outputs an overcurrent reset pulse on line 82 at transition 212, which causes line 46 to transition high at 214, which causes line 48 to transition high at 216, to provide the noted blanking interval. Clock pulse positive transition 218 on line 94 clocks flip flop 86 such that line 46 transitions low at 220 to turn on the power switch, such that bus current rises. The bus current signal reaches peak point 222 at threshold 103, and an overcurrent reset pulse is generated on line 82 at transition 224, whereby line 46 goes high at transition 226, and line 48 goes high at transition 228, providing the noted blanking interval. Positive going clock pulse transition 230 on line 94 clocks flip flop latch 86 such that line 46 goes low at transition 232, turning on the power switch, such that bus current again rises. The bus current rises to peak point 234 at threshold 103, to generate the overcurrent reset pulse at transition 236 on line 82, which resets flip flop latch 86, causing line 46 to go high at transition 238, causing line 48 to go high at transition 240, providing the noted blanking interval, during which the sum of inductive current and regeneration current if any is checked. Positive going clock pulse transition 242 on line 94 clocks flip flop latch 86, such that line 46 goes low at transition 244, turning the power switch back on, such that bus current again rises. The bus current signal rises to peak point 246 at threshold 103, causing line 82 to go high at transition 248, resetting flip flop latch 86, causing line 46 to transition high at 250, turning off the power switch, and causing line 48 to transition high at 252, providing the noted blanking interval. Positive going clock pulse transition 254 clocks flip flop latch 86, causing line 46 to go low at transition 256, turning the power switch back on, such that bus current again rises. The bus current signal rises to peak point 258 at threshold 103, which causes line 82 to transition high at 260, which resets flip flop latch 86, causing line 46 to go high at transition 262, turning off the power switch, and causing line 48 to transition high at 264, providing the noted blanking interval. Positive going clock pulse transition 266 on line 94 clocks flip flop latch 86, such that line 46 goes low at transition 268 to turn the power switch back on, such that bus current again increases. The bus current signal rises to peak point 270 at threshold 103, causing comparator 80 to transition high at 272 on line 82, which resets flip flop latch 86, causing line 46 to transition high at 274, turning off the power switch, and causing line 48 to transition high at 276, providing the noted blanking interval. During the blanking interval, the reverse bus current due to inductive current and regeneration current as shown at negative peak 271 has negatively increased slightly beyond that shown at negative peak 259 which has negatively increased slightly beyond that shown at negative peaks 247, 235, 223, 211, 189. The value of such current, however, still does not exceed the noted given threshold at 291 which has a magnitude of the energization current level 103 plus a small regenerative current threshold.

Positive going clock pulse transition 280 on line 94 clocks flip flop latch 86, such that line 46 goes low at transition 282, such that the power switch turns back on, and bus current again increases. The bus current signal rises to peak point 284 at threshold 103, and output line 82 of comparator 80 transitions high at 286 to reset flip flop latch 86, such that line 46 transitions high at 288 to turn off the power switch, and line 48 transitions high at 290, providing the noted blanking interval.

During the blanking interval initiated at positive going transition 290 on line 48, with the power switches turned off, the reverse bus current signal representing the above noted inductive current and regeneration current reaches negative peak 285 at threshold 291 which is greater in amplitude and opposite in polarity to threshold 103. Current comparator 60, FIG. 7, senses the absolute value of negative current peak 285 on line 43 and compares same against the absolute value of the positive peak current at level 103. The output of comparator 60 goes high when the absolute value of the current on line 43 exceeds the absolute value of the current from track and hold circuit 62 as shown at level 103. This occurs at negative peak current 285 which reaches level 291 which is greater in amplitude by the regenerative current threshold but opposite in polarity to level 103. At this point, the reverse bus current provided by inductive current and regeneration current exceeds the energization current, i.e. the bus current flowing leftwardly through resistor 36 in FIG. 1 during the blanking interval exceeds the current flowing rightwardly through resistor 36 during the energization interval.

Responsive to reverse bus current peak 285, FIG. 10, the output of current comparator 60, FIG. 7, goes high, such that the output of OR gate 58 goes high, which in turn triggers state counter 56 to change states, i.e. commutate to the next state, e.g. from state 1 to state 2, or from state 2 to state 3, etc. The high output from OR gate 58 also triggers one shot multivibrator 70, such that the latters output on line 74 transitions low at 292, FIG. 9, to provide a low pulse of given duration until one shot multivibrator 70 times out as shown at above noted positive going transition 140. The high output of OR gate 58 also triggers one shot multivibrator 72 to generate a negative going pulse at transition 294 on output line 76, which negative pulse has a very short duration and terminates at positive going transition 296. The negative pulse between transitions 294 and 296 on line 76 provides a low state to one of the inputs of NAND gate 160, FIG. 8, such that the latters output on line 48 is maintained high during such interval between transitions 294 and 296, such that the power switches are off during such interval to enable stabilization of same, including dissipation of capacitive and inductive current, upon the noted commutation.

After the noted commutation at current peak 285, FIG. 10, due to triggering of OR gate 58 by current comparator 60, the cycle repeats. Positive going clock pulse transition 300, FIG. 9, clocks flip flop latch 86, FIG. 8, and line 46 goes low at transition 302 to turn the respective chosen power switch on, such that bus current rises as shown at segment 304, FIG. 10. At positive going clock pulse transition 306, the bus current still has not risen to threshold 103, and hence there is no overcurrent reset pulse on line 82. The selected power switch remains on, and bus current continues to rise. The cycle continues as above described.

Upon commutation from one state to the next, there will be a finite amount of time before regeneration current occurs. The length of the negative current loop inhibit enable pulse from transition 292 to transition 140 is chosen accordingly. For example, in a 3,600 rpm motor, the length of such pulse is chosen to be about 1.5 milliseconds because no regeneration current will occur within 1.5 milliseconds following commutation. Upon completion of this interval, as shown at transition 40, the reverse bus current flow is checked, during the noted blanking intervals, as shown initiated at transitions 162, 178, 194, 216, 228, 240, 252, 264, 76, 290. During such intervals, the reverse bus current flow is due only to inductive current, until regeneration current occurs and increases the reverse bus current flow to the peak point at shown at 285, whereupon the circuitry is commutated to the next state.

After transition 140, reverse bus current flow is checked during each clock pulse cycle. An overcurrent reset pulse on line 82, as at transition 224, 236, etc., causes line 48 to go high at transition 228, 240, etc., to provide the noted blanking interval for checking reverse bus current flow.

Because of flip flop latch 196 and NOR gate 200, a switch inhibit control pulse on line 48 is generated for each clock pulse cycle during which the current loop inhibit enable signal on line 74 is high, regardless of whether an overcurrent reset pulse on line 82 goes high. Flip flop latch 196 remembers if one shot multivibrator 148 inhibited the power switches, and if not, lets NOR gate 200 pass the clock signal on line 94 through to inhibit the power switches. The power switches are thus inhibited once during each clock cycle while the current loop inhibit enable signal on line 74 is high. As above described, reset pulse transition 144 on line 82 initiates switch inhibit control pulse transition 162 on line 48. In response to the positive going edge of the high state on line 46 at transition 146, one shot multivibrator 148 is triggered, and output 150 goes high, which resets flip flop 196 such that the latter's $\overline{Q}$ output goes high on line 198 which maintains a high state at one of the inputs to NOR gate 200, even if the clock pulse on the other input 94 transitions low, such that the output of NOR gate 200 on line 202 remains low, and input 154 of NAND gate 156 is controlled by output 150 of one shot multivibrator 148, such that when the latter times out, line 48 goes low at transition 166. If the clock pulse on line 94 transitions high again, as at 168, before the next overcurrent reset pulse 174, flip flop 196 is clocked and its $\overline{Q}$ output on line 198 goes low, but the clock pulse on line 94 at the other input to NOR gate 200 is now high, and hence the output of NOR gate 200 on line 202 is low, such that input 154 of NAND gate 156 remains low, and line 48 remains low. If there is still no overcurrent reset pulse on line 82 before the next clock cycle, then the next negative going clock pulse transition on line 94 provides a low input to NOR gate 200 which in combination with the low state on line 198 causes the output of NOR gate 200 on line 202 to go high which in turn provides a high state at input 154 of NAND gate 156 which in turn causes the output of NAND gate 160 on line 48 to go high to provide the noted blanking interval pulse. If an overcurrent reset pulse does occur on line 82 before the next clock cycle, then the blanking interval pulse is generated as above described at transition 178 caused by transition 174 on line 82. Flip flop latch 196 and NOR gate 200 thus provide the noted memory function and guarantee a switch inhibit control pulse on line 48 to provide the noted blanking interval during each clock cycle after the current loop inhibit enable signal on line 74 transitions high at 140.

In FIGS. 11-23, a variable commutation delay interval is provided between commutations from state to state, during which delay interval all phases are unenergized to minimize potentially destructive current spikes upon commutation.

In energization state 1, FIG. 1, switch S1 is on and switch S4 is pulse width modulated between on and off conditions. Energization current $I_E$ flows from DC power supply 22, rightwardly through bus conductor 24, through switch S1, through phase A, through phase B, through switch S4 when the latter is on, leftwardly through bus conductor 26, back to DC power supply 22. In state 2, FIG. 2, switch S4 is on and switch S5 pulse width modulates between on and off conditions. In state 2, energization current $I_E$ flows from DC power supply 22, rightwardly through bus conductor 24, through switch S5 when the latter is on, through phase C, through phase B, through switch S4, leftwardly through bus conductor 26, and back to DC power supply 22. In state 2, current through energized phase B is equal to the sum of energization current through energized phase C plus inductive current through unenergized phase A due to the previous energization thereof in state 1. The sum of such currents causes the above noted potentially destructive current spikes.

Figure 12:
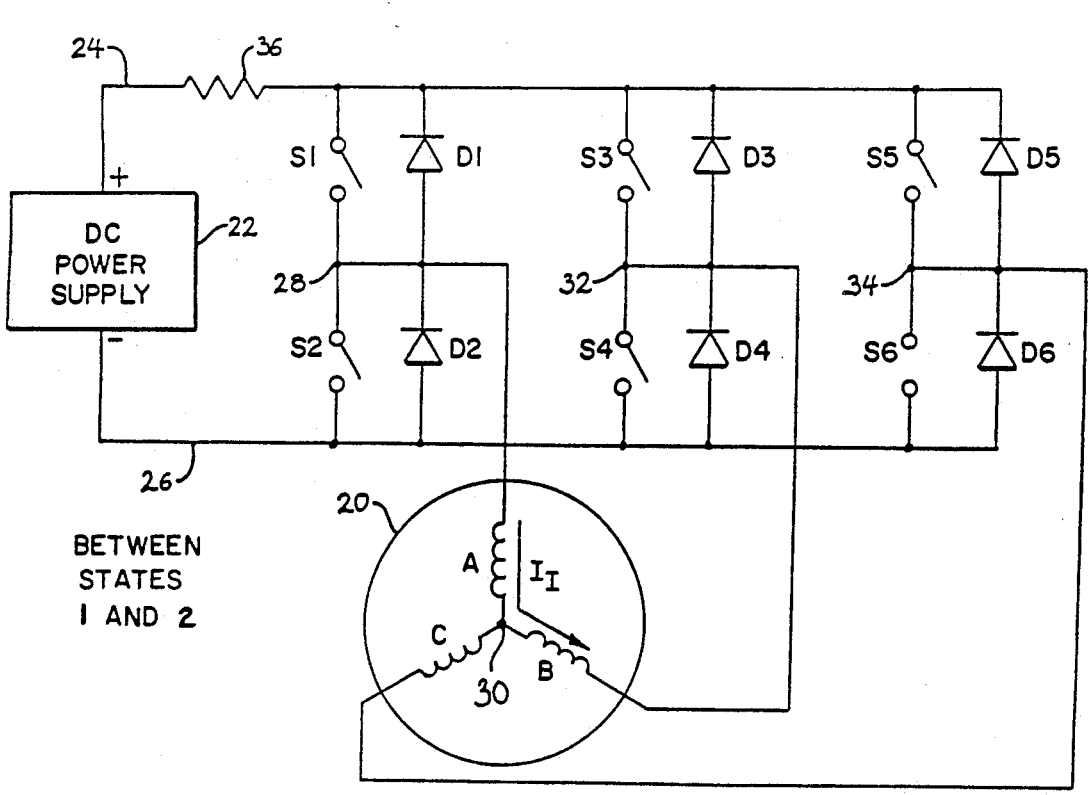
FIG. 12 is like FIG. 1 and shows a condition between the first and second energization states.
Figure 13:
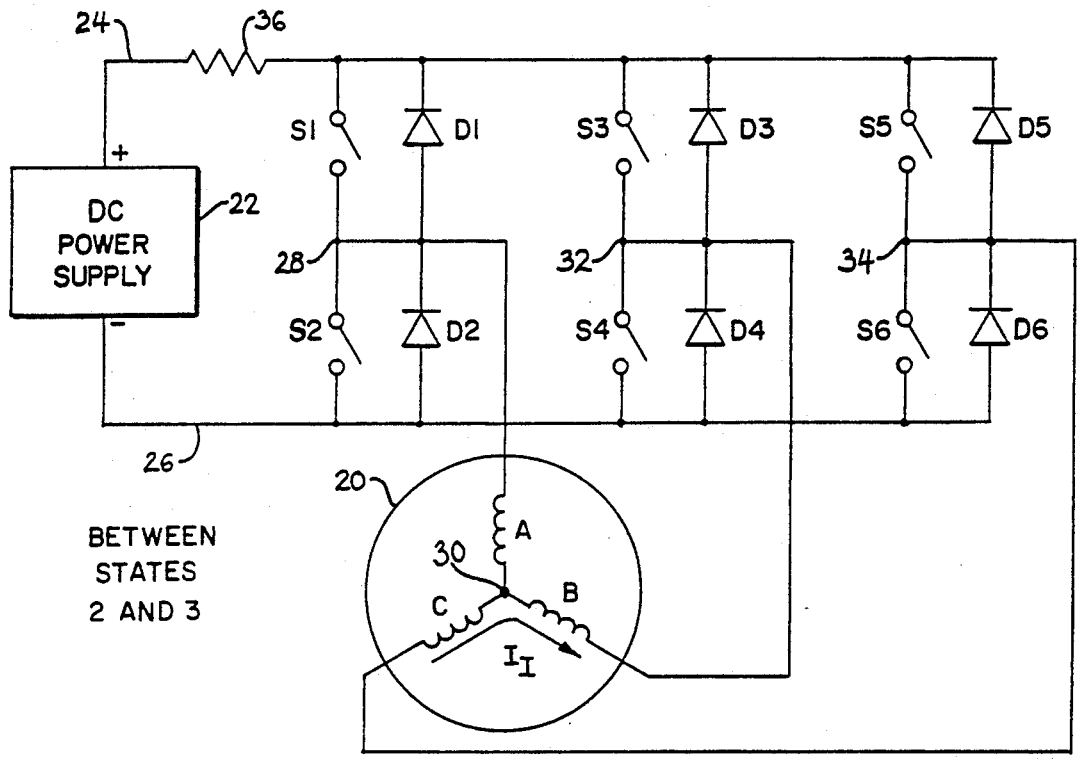
FIG. 13 is like FIG. 1 and shows a condition between the second and third energization states.
Figure 14:
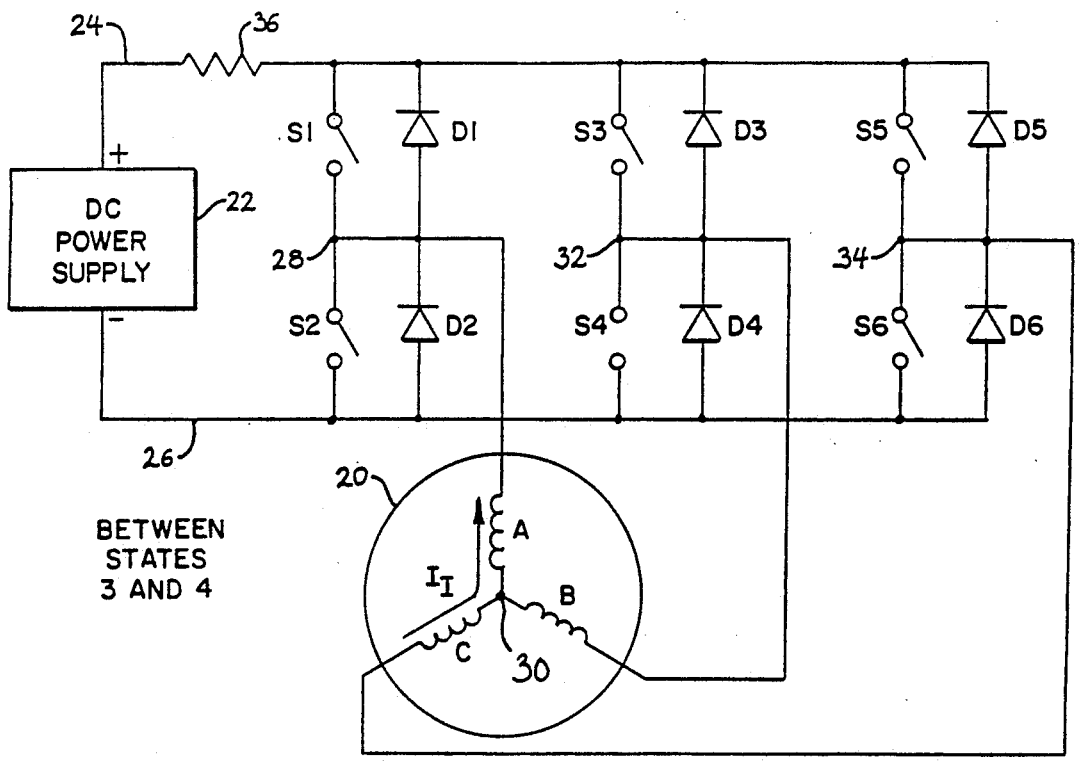
FIG. 14 is like FIG. 1 and shows a condition between the third and fourth energization states.
Figure 15:
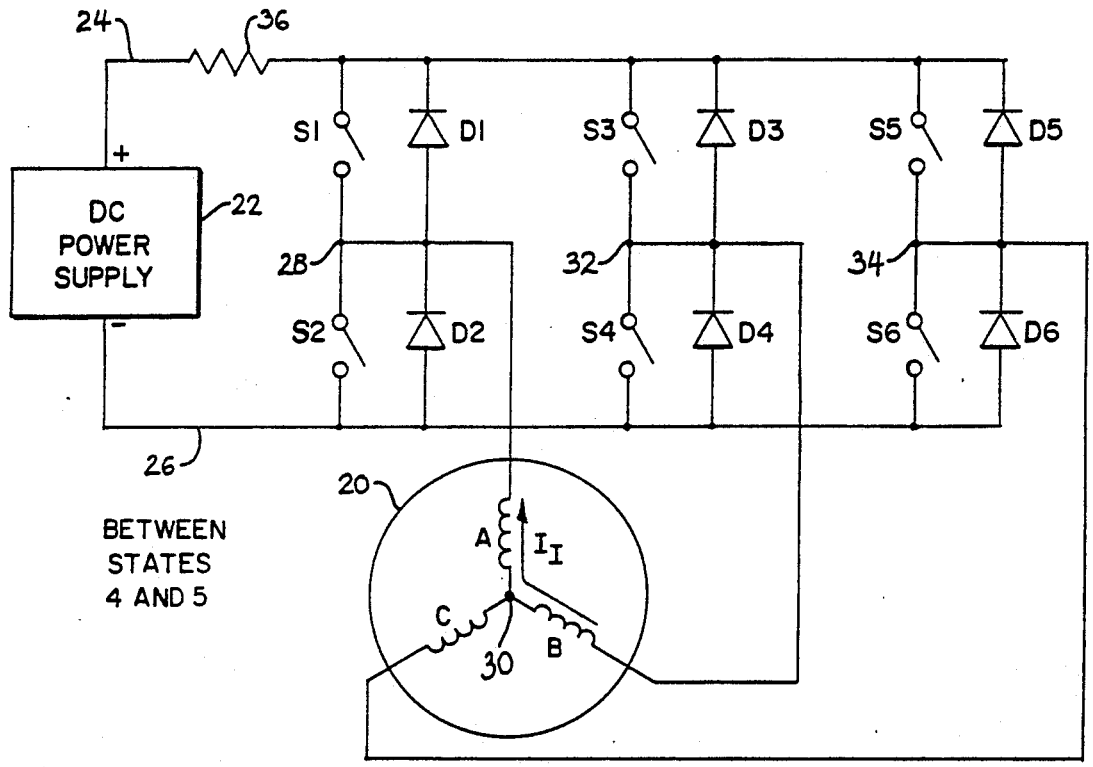
FIG. 15 is like FIG. 1 and shows a condition between the fourth and fifth energization states.
Figure 16:
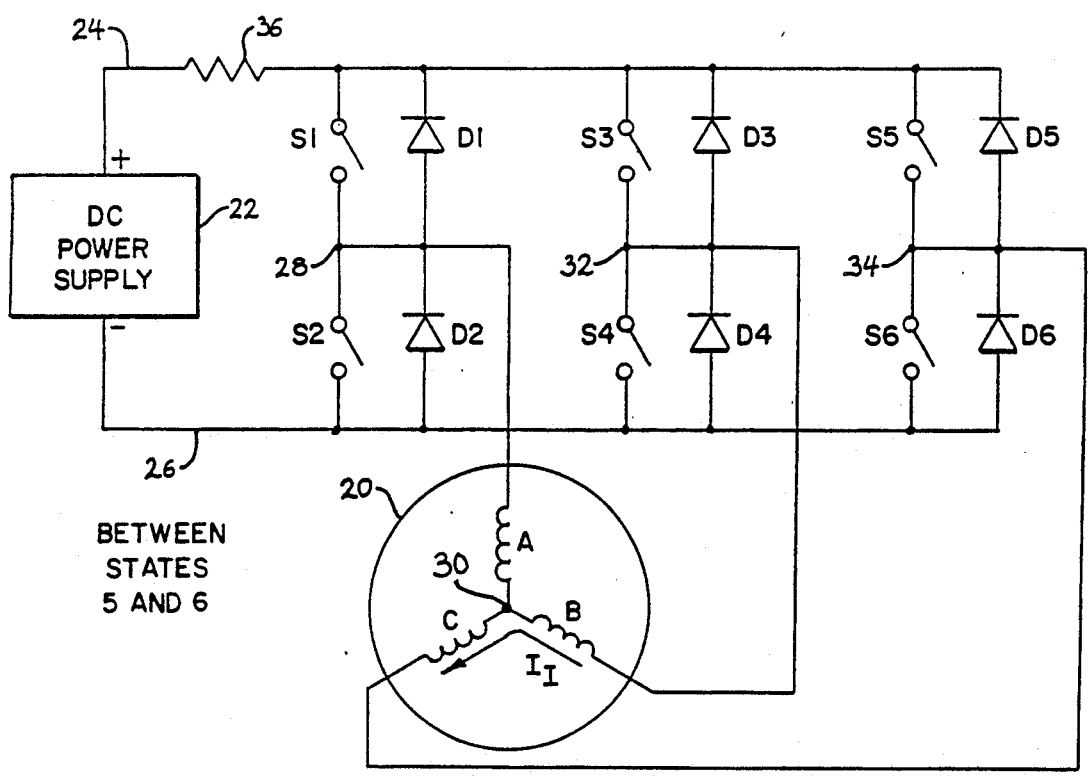
FIG. 16 is like FIG. 1 and shows a condition between the fifth and sixth energization states.

Referring to FIG. 12, a commutation delay interval is provided between states 1 and 2 during which delay interval all phases are unenergized, i.e. all switches S1-S6 are off. During this interval, current continues to flow through the windings of phases A and B due to their inductance. This inductive current $I_I$ continues to flow in the same direction as energization current $I_E$ of state 1, FIG. 1. Hence, inductive current $I_I$ in FIG. 12 flows through phase A, through phase B, through diode D3, leftwardly through bus conductor 24, through DC power supply 22 in a polarity opposing such power supply, then rightwardly through bus conductor 26, through diode D2, to return to phase A. This current flow path in reverse polarity through DC power supply 22 causes the inductive current $I_I$ to rapidly dissipate because the phase windings must source a voltage sufficient to overcome DC power supply 22 to cause the inductive current to flow. It is preferred that all switches S1-S6 be off during the delay interval, to provide maximum dissipation of inductive current. If switch S4 is on, for example as in state 2, then inductive current $I_I$ through phase A and phase B will not flow through diode D3 to bus conductor 24, but instead will flow through switch S4 and then through diode D2 to return to phase A, which would bypass DC power supply 22. Since the phase inductance would then not be required to overcome DC power supply 22, such inductance would not dissipate as fast. This in turn would provide a greater inductive current contribution from phase A to the current in phase B upon commutation to state 2.

In state 3, current through energized phase C is equal to the sum of energization current $I_E$ through energized phase A plus inductive current through unenergized phase B due to previous energization thereof in state 2. The sum of such currents causes the noted potentially destructive current spikes. Between states 2 and 3, FIG. 13, a commutation delay interval is provided during which all phases are unenergized, to minimize the noted current spikes upon commutation. During the delay interval, inductive current $I_I$ flows through phase B, through diode D3, leftwardly through bus conductor 24, through DC power supply 22 in a polarity opposing such DC power supply, then rightwardly through bus conductor 26, through diode D6, through phase C, to return to phase B. This current flow path in reverse polarity through DC power supply 22 causes the inductive current $I_I$ to rapidly dissipate before commutation to state 3.

In state 4, current through energized phase A is equal to the sum of energization current $I_E$ through phase B plus inductive current through unenergized phase C due to previous energization thereof in state 3. The sum of such currents causes the noted potentially destructive current spikes. Between states 3 and 4, FIG. 14, a commutation delay interval is provided during which all phases are unenergized, i.e. switches S1-S6 are all off. During this delay interval, inductive current $I_I$ flows through phase C, through phase A, through diode D1, leftwardly through bus conductor 24, through DC power supply 22 in a polarity opposing such supply, then rightwardly through bus conductor 26, through diode D6, to return to phase C, to rapidly dissipate the inductive current $I_I$ before commutation to state 4.

In state 5, current through energized phase B is equal to the sum of energization current $I_E$ through phase C plus inductive current through unenergized phase A due to previous energization thereof in state 4. The sum of such currents causes the noted potentially destructive current spikes. A commutation delay interval is provided between states 4 and 5, FIG. 15, during which interval all phases are unenergized, i.e. all switches S1-S6 are off, to minimize the noted current spikes upon commutation. During the delay interval, inductive current $I_I$ flows through phase A, through diode D1, leftwardly through bus conductor 24, through DC power supply 22 in a polarity opposing such supply, then rightwardly through bus conductor 26, through diode D4, through phase B, to return to phase A, to rapidly dissipate the inductive current $I_I$ before commutation to state 5.

In state 6, current through energized phase C is equal to the sum of energization current $I_E$ through energized phase A plus inductive current through unenergized phase B due to previous energization thereof in state 5. The sum of such currents causes the noted potentially destructive current spikes. A commutation delay interval is provided between states 5 and 6, FIG. 16, during which interval all phases are unenergized, i.e. all switches S1-S6 are off, to minimize the noted current spikes. During the delay interval, inductive current $I_I$ flows through phase B, through phase C, through diode D5, leftwardly through bus conductor 24, through DC power supply 22 in a polarity opposing such supply, then rightwardly through bus conductor 26, through diode D4, to return to phase B, to rapidly dissipate the inductive current $I_I$ before commutation to state 6.

In state 1, current through energized phase A is equal to the sum of energization current $I_E$ through phase B plus inductive current through unenergized phase C due to previous energization thereof in state 6. The sum of such currents causes the noted potentially destructive current spikes. A commutation delay interval is provided between states 6 and 1, FIG. 11, during which delay interval all phases are unenergized, i.e. all switches S1-S6 are off, to minimize the noted current spikes upon commutation. During the delay interval, inductive current $I_I$ flows through phase C, through diode D5, leftwardly through bus conductor 24, through DC power supply 22 in a polarity opposing such supply, then rightwardly through bus conductor 26, through diode D2, through phase A, to return to phase C, to rapidly dissipate the inductive current $I_I$ before commutation to state 1.

In state 2, as above described, current through energized phase B is equal to the sum of energization current $I_E$ through energized phase C plus inductive current through unenergized phase A due to previous energization thereof in state 1. The sum of such currents causes the noted potentially destructive current spikes. A commutation delay interval is provided between states 1 and 2, FIG. 12, during which delay interval all phases are unenergized, i.e. all switches S1-S6 are off, to minimize the current spikes upon commutation. During the delay interval, inductive current $I_I$ flows through phase A, through phase B, through diode D3, leftwardly through bus conductor 24, through DC power supply 22 in a polarity opposing such supply, then rightwardly through bus conductor 26, through diode D2, to return to phase A, to rapidly dissipate the inductive current $I_I$ before commutation to state 2.

Figure 17:
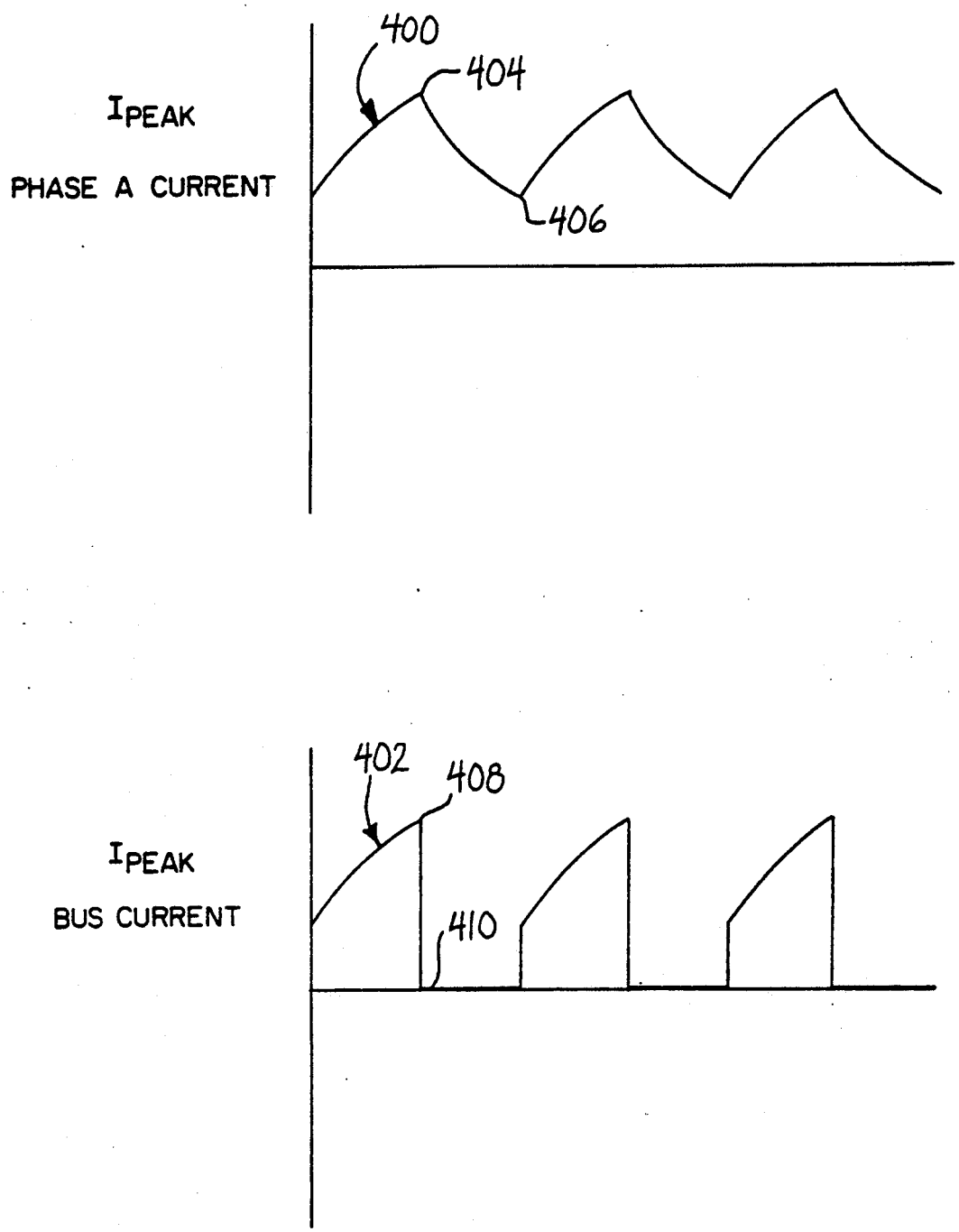
FIG. 17 is a waveform diagram showing phase current and bus current.
Figure 18:
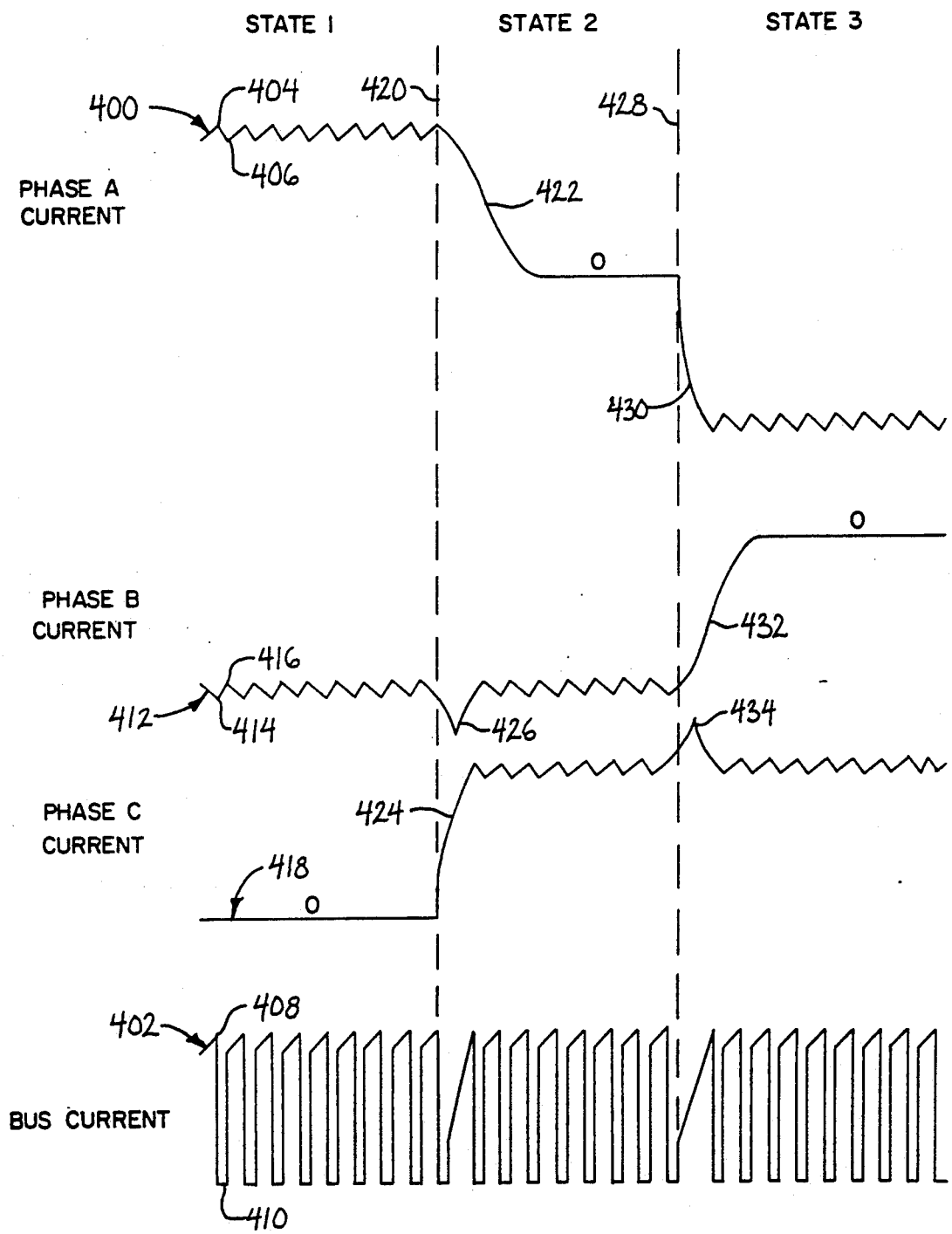
FIG. 18 is a waveform diagram showing bus current and showing current in each of the phases for various states, without use of the invention in application Ser. No. 07/400,461.

FIG. 17 shows at waveform 400 the current through phase A during state 1, and shows at waveform 402 the bus current through sensing resistor 36. Switch S1 is on, and switch S4 pulse width modulates between on and off conditions to provide the above noted current regulation between peaks 404 and valleys 406. When switch S4 is on, the phase current rises to peak 404, whereupon switch S4 turns off, and the current falls to point 406, and the cycle repeats, as above described in the noted parent application and as is known in the art. This is also shown in FIG. 18 for states 1, 2 and 3. Phase A current rises positively to peak 404 and falls negatively to valley 406, and phase B current as shown at waveform 412 rises negatively to peak 414 and falls to valley 416. Phase C is unenergized, and hence the current flow therethrough is zero as shown at waveform 418. The bus current through sensing resistor 36 as shown at waveform 402 rises positively to peak 408 and falls to zero at valley 410. If the commutation method of FIGS. 1–10 is used, then the bus current would rise negatively below zero during state 1 during the noted blanking intervals as shown in FIG. 10 at negative peaks 164, 180, 189, 211, 223, 235, 247, 259, 271, 285. The subject matter of FIGS. 11–23 may be used with various current commutation schemes, including that in FIGS. 1–10.

At the end of state 1 as shown at vertical dashed reference line 420, FIG. 18, if the motor is immediately commutated to state 2, switch S1 is turned off, switch S4 is turned on, and switch S5 is pulse width modulated between on and off conditions. The current through phase A continues to flow due to the inductance thereof as shown at 422, which inductive current $I_I$ flows through phase A, through phase B, through switch S4, through diode D2, to return to phase A. Energization current $I_E$ begins to flow through phase C as shown at 424. The current through phase B is the sum of energization current $I_E$ through phase C plus the inductive current $I_I$ through phase A. If the current rise at 424 through phase C is faster than the current decay at 422 through phase A, then a potentially destructive current spike results in phase B as shown at 426. Current spike 426 rises negatively beyond the normal pulse width modulated negative current level at peak 414 in phase B.

Figure 19:
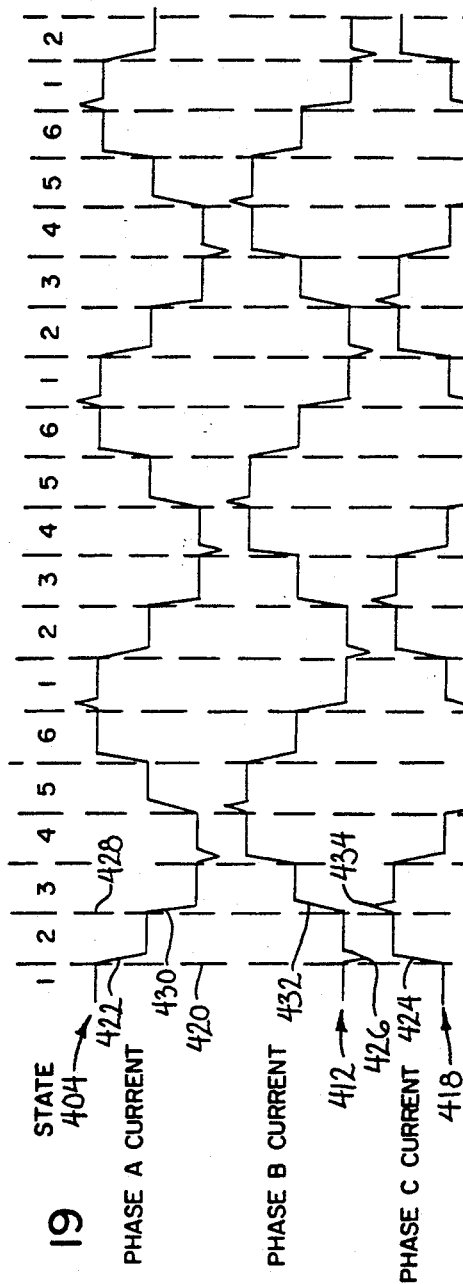
FIG. 19 is a waveform diagram showing phase currents, without use of the invention in application Ser. No. 07/400,467.
Figure 21:
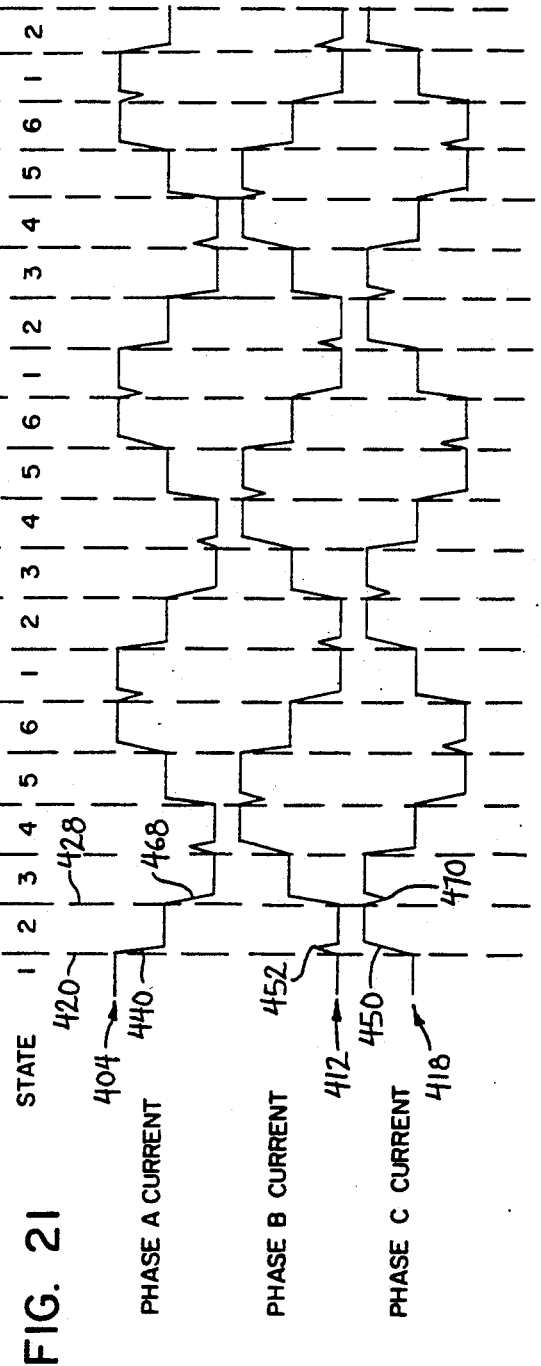
FIG. 21 is like FIG. 19, but shows the resulting waveforms when the invention in application Ser. No. 07/400,467 is used.

At the end of state 2 as shown at vertical dashed reference line 428, FIG. 18, if the motor is immediately commutated to state 3, switch S4 is turned off, switch S5 is turned on, and switch S2 is pulse width modulated between on and off conditions. The current in phase A immediately begins to rise negatively at 430. The negative current in phase B begins to dissipate at 432. The current through energized phase C is equal to the sum of energization current $I_E$ through phase A at 430 plus inductive current $I_I$ through unenergized phase B at 432 due to previous energization thereof in state 2. If the current rise in phase A at 430 is faster than the current decay in phase B at 432, then a potentially destructive current spike results in phase C at 434. Current spikes for the other states are illustrated in FIG. 19 showing larger portions of the waveforms.

Figure 20:
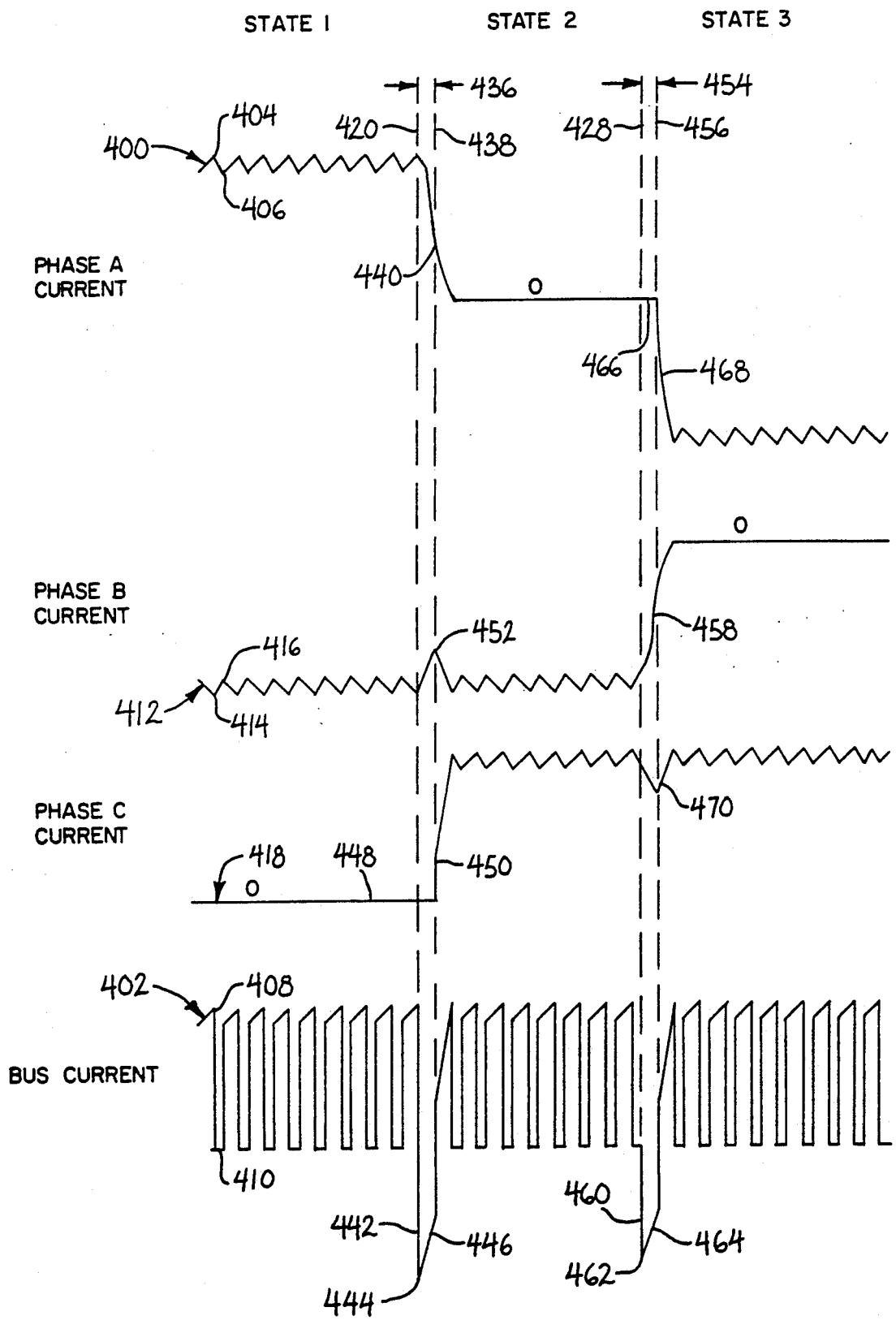
FIG. 20 is like FIG. 18, but shows the resulting waveforms when the invention in application Ser. No. 07/400,467 is used.

FIG. 20 is similar to FIG. 18 and uses like reference numerals where appropriate to facilitate understanding. At the end of state 1 at 420, a delay interval 436 is provided between states 1 and 2 as shown at gap 436 between vertical dashed reference lines 420 and 438. During delay interval 436, FIG. 12, all phases are unenergized, i.e. all switches S1-S6 are off. Inductive current $I_I$ flows through phase A, through phase B, through diode D3, leftwardly through bus conductor 24 and bus current sensing resistor 36, through DC power supply 22 in a polarity opposing such supply, then rightwardly through bus conductor 26, through diode D2, to return to phase A, to rapidly dissipate inductive current $I_I$ as shown at 440, which decay is more rapid than that shown at 422 in FIG. 18. The noted inductive current flow leftwardly through bus sensing resistor 36 in FIG. 12 is shown at negatively rising bus current 442 in FIG. 20 to negative peak 444 which then decays at 446. During delay interval 436, the current through phase C remains at zero as shown at 448, and does not begin to rise until 450 at the end of the delay interval at 438. The current rise in phase C at 448, which is zero, is slower than the current decay at 440 in phase A, which eliminates the current spike in the sum of such currents in phase B. The current in phase B actually falls as shown at 452 in FIG. 20, rather than rising as shown at peak 426 in FIG. 18.

At the end of state 2, a delay interval 454 is provided as shown at gap 454 between vertical dashed reference lines 428 and 456. During delay 454 between states 2 and 3, FIG. 13, all phases are unenergized, i.e. all switches S1-S6 are off. Inductive current II flows through phase B, through diode D3, leftwardly through bus conductor 24 and bus current sensing resistor 36, through DC power supply 22 in a polarity opposing such supply, then rightwardly through bus conductor 26, through diode D6, through phase C, to return to phase B, to rapidly dissipate the inductive current $I_I$ as shown at 458, FIG. 20. The leftward bus current flow through resistor 36 is shown at negatively rising bus current 460 to negative peak 462 which then decays as shown at 464. During delay interval 454, current in phase A remains at zero as shown at 466, and does not begin to rise until 468 at the end of the delay interval at 456. The current rise in phase A at 466, which is zero, is slower than the current decay at 458 in phase B. This eliminates the noted potentially destructive spike in the sum of such currents in phase C upon commutation to state 3. The current in phase C actually drops as shown at 470 in FIG. 20, instead of rising positively at current spike 434 in FIG. 18. The elimination of the noted potentially destructive current spikes in the other states is further shown in FIG. 21 which shows larger portions of the waveforms. Potentially destructive current spikes such as 426 and 434 in FIG. 19 are replaced by current reductions such as 452 and 470, respectively, in FIG. 21.

The subject matter of FIGS. 11–23 provides a variable, rather than fixed, commutation delay interval between commutations from state to state. The duration of the delay intervals such as 436, 454, etc., FIG. 20, is varied according to a given motor operating parameter during operation of the motor to optimize the duration of the delay interval for different operating conditions, to provide maximum delay when needed to eliminate current spikes, and to provide minimum delay when unneeded, to in turn provide maximum energization current to the phases. For example, at high motor speeds, the noted potentially destructive current spikes do not appear, and hence a commutation delay interval is not needed, and in fact is undesirable because such delay would reduce the motor's efficiency and output power. This is because the delay reduces the energization time duration of the phases, which in turn provides less time in which to build up the current in the energized phase. At high motor speed, there is less time between commutations, and hence less time to build up current in the energized phases. Any further reduction of such time by a delay interval would only serve to reduce the energization level of the phases, and hence reduce motor output. Furthermore, at high motor speed, the motor's back EMF reduces the noted current spikes, hence further eliminating the need for a commutation delay interval. On the other hand, at low motor speeds, there is less back EMF to reduce the noted current spikes, and a commutation delay interval is desirable. At low motor speed the inductive current decay upon turn-off of the power switches is slower than at high motor speed and there is sufficient time to build up energization current in the phases even after a commutation delay interval.

Figure 22:
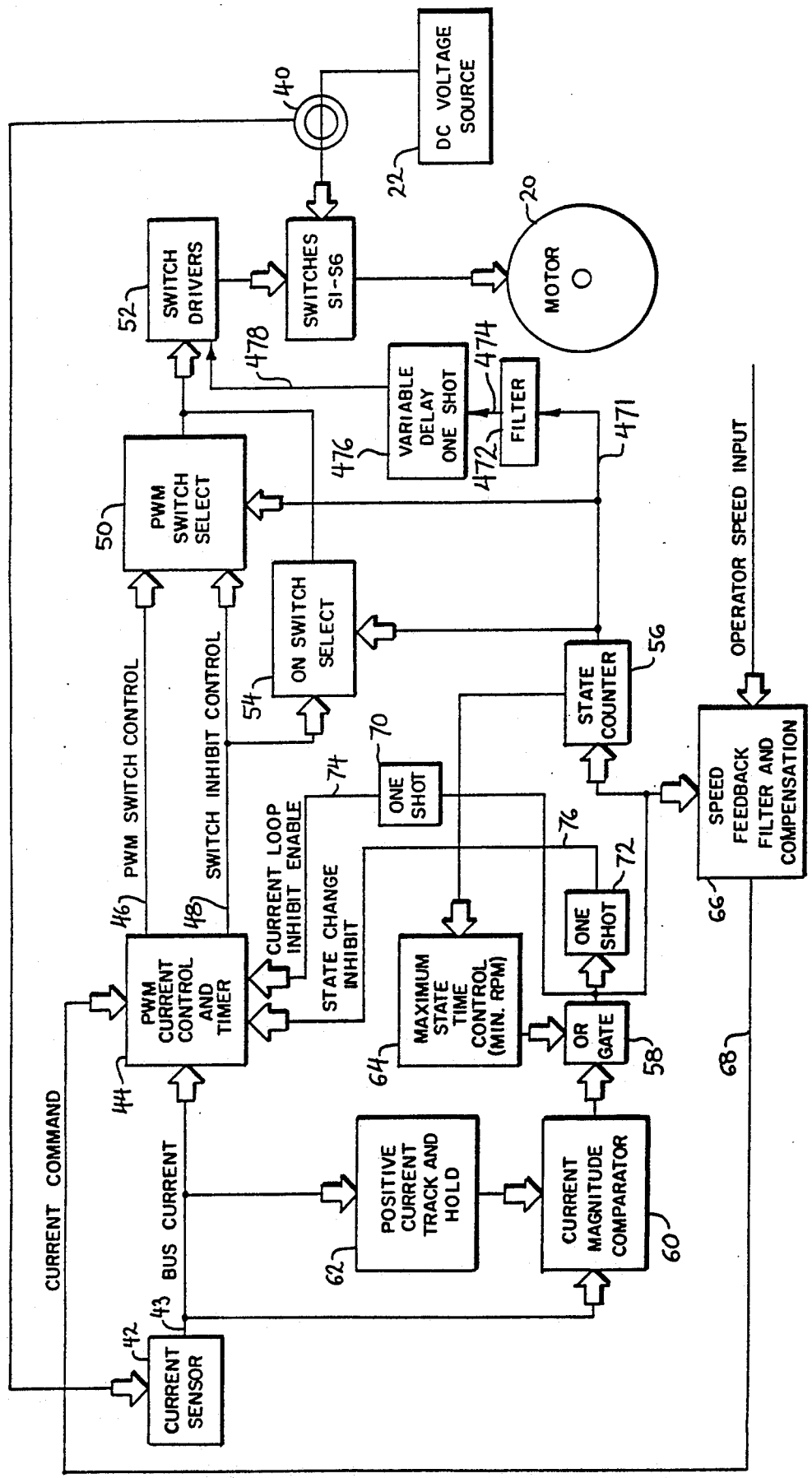
FIG. 22 shows control circuitry in accordance with the invention in application Ser. No. 07/400,467.

In one embodiment, FIG. 22, motor speed is sensed, and the duration of the variable commutation delay interval is varied in response to sensed motor speed to shorten the duration with increasing motor speed. FIG. 22 uses like reference numerals from FIG. 7 where appropriate to facilitate understanding. State counter 56 has an output corresponding to commutation frequency, which in turn increases with increasing motor speed. The output pulses from state counter 56 are supplied on line 471 to a capacitive filter 472 which is charged to higher stored values by increasing frequency of such pulses and provides a digital to analog conversion by averaging the pulses and producing a DC voltage corresponding to the speed of rotation of the motor and which also relates to the back EMF of the motor. The analog output from filter 472 is supplied on line 474 to variable delay one shot monostable multivibrator 476 which generates an output pulse on line 478 having a duration determined by the level of analog input 474. The duration of the output pulse on line 478 decreases with increasing motor speed, i.e. with increasing commutation frequency from state counter 56. During the output pulse on line 478, switch drivers 52 are disabled, such that all switches S1-S6 are off. This provides the noted commutation delay interval. With increasing motor speed, the duration of the output pulse on line 478 decreases, which in turn decreases the duration of the commutation delay interval 436, 454, etc., FIG. 20. State counter 56 provides a convenient and available tachometer for sensing motor speed, though other motor speed sensors may be used, for example Hall sensors, a variable reluctance wheel, such as a steel gear and a Hall effect switch with a magnet, a variable reluctance wheel and a magnetic pick-up including a coil of wire wrapped around a permanently magnetized iron rod with appropriate amplification circuitry, a magnetic wheel and a nonmagnetized pick-up coil to detect flux transitions, an optical sensor with a light source and a wheel with holes in it to alternately block and transmit light, a permanently magnetized magnetic pickup coil detecting one or more key-ways in the motor shaft, a voltage sensor sensing motor back EMF, etc.

Figure 23:
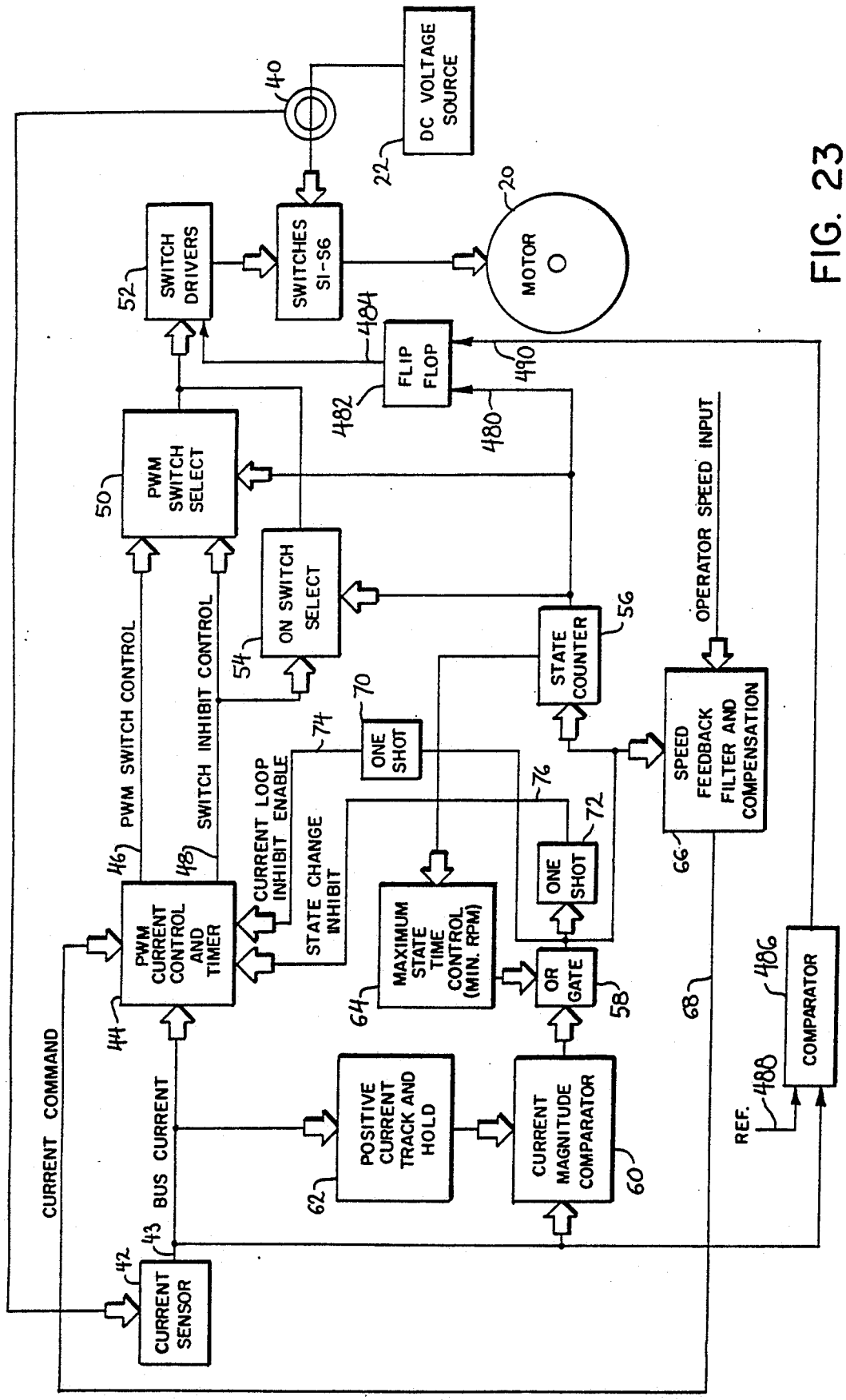
FIG. 23 shows an alternate embodiment of control circuitry in accordance with the invention in application Ser. No. 07/400,467.

In another embodiment, FIG. 23, the duration of the commutation delay interval is varied in response to sensed DC bus current. The level of DC bus current is sensed, and termination of the delay interval is prevented until the level of the DC bus current drops below a given value. FIG. 23 is like FIG. 7 and uses like reference numerals where appropriate to facilitate understanding. The output of state counter 56 is supplied to the set input 480 of flip flop 82 to cause the flip flop's output 484 to transition at the end of the commutation state, which transition initiates the delay interval 436, 454, etc., FIG. 20, until commutation to the next state. The transitioned state on output 484 is supplied to switch drivers 52 to turn off all switches S1-S6, providing the noted commutation delay interval 436, 454, etc. The sensed DC bus current signal at output 43 of current sensor 42 is supplied to a comparator 486 which compares the level of the DC bus current against a reference 488. When the level of the DC bus current drops below the given reference value, comparator 486 provides an output signal to reset input 490 of flip flop 82 causing the latter's output 484 to return-transition, terminating the output signal to switch drives 52 and terminating the commutation delay interval and enabling the selected of switches S1-S6 to be turned on. In one embodiment, the flip flop function of circuit element 482 is provided by a one shot monostable multivibrator which is not allowed to time out until a signal is received at input 490 indicating that the DC bus current has dropped below the given reference value.

The subject matter of FIGS. 11-23 solves the above noted current spike or overshoot problem. Upon commutation to the present state, current through one of the presently energized phases is equal to the sum of energization current through the other presently energized phase plus inductive current through the presently unenergized phase due to energization thereof in the previous state. Such sum of currents causes potentially destructive current spikes if the current in the noted other presently energized phase builds up faster than the inductive flywheeling current through the presently unenergized phase dissipates. A variable commutation delay interval is provided between commutations from state to state, during which delay interval all phases are unenergized and during which the noted inductive flywheeling current is directed to be detected by the bus current sensor and to flow through the DC power supply in opposite polarity thereto, to minimize the noted current spikes upon commutation. Switches S1-S6 are turned off during the delay interval for a duration varying inversely with motor speed, or for a duration to allow the residual inductive current to fall below a given reference level. Both methods eliminate destructive current overshoot, while still allowing for the fastest buildup of energization current in the next pair of motor phases. For example, upon commutation from state 1 to state 2, without the previous commutation delay, current rise in phase C is in proportion to the voltage across the motor winding inductance of phase C which is approximately the difference between the DC power supply voltage and the sum of the back EMF of phases B and C. The decay of current in phase A is in proportion to the voltage supplied by the motor winding inductance of phase A which is approximately the sum of the back EMF of phases A and B. If the motor is turning relatively slowly or is stopped, the magnitude of the back EMF of phases A, B and C is small in comparison to the voltage of DC power supply 22, which is typically a capacitor bank fed through a rectifying bridge from an AC source. The current will thus rise in phase C faster than the current decays in phase A at low motor speed. By turning off all switches S1-S6 during the commutation delay interval, the inductive current $I_f$ through phase A decays rapidly because the inductance of phase A must source a voltage that is approximately the sum of the back EMF's of the previously energized phases and the voltage of DC power supply 22, to continue current flow.

Present Invention

As noted above, peak current regulation as used in the prior art limits the peak current of each PWM cycle to a fixed level. This method has the advantage of using only one current sensor and having a faster response time since the current waveform is not time averaged. However, this method has the disadvantage of reduced torque at high motor speeds. This is caused by the back EMF of the motor which increases as speed increases and causes increased ripple in the current waveform. Different motor inductances will also cause different amounts of ripple and different average currents. If the peak current is held constant as shown at peaks 502 in FIG. 24, the average current decreases, as shown in the difference from dashed line average current 504 to dashed line average current 506. Current level 504 is the average between peaks 502 and valleys 508. Current level 506 is the average between peaks 502 and valleys 510. The decrease in average phase current from level 504 to level 506 results in proportionately less torque.

In the present invention, a control method is provided for electric motor 20 comprising energizing the motor through pulse width modulated switch means S1–S6 to apply energization voltage from DC power supply 22 through bus conductors 24 and 26 to the motor in a respective on condition of the switches such that motor current reaches a given peak value, and then turning off the respective switches such that motor current decreases, and then turning the respective switches back on until motor current again increases to the peak value, and then turning off the switches, and so on, to regulate motor current, each pair of on and off conditions of the switches constituting a PWM cycle. The present method samples the required peak motor current value from a previous PWM cycle and calculates the required peak motor current value for the present PWM cycle, and repeats the sampling and calculating every PWM cycle, and updates the new required peak motor current value every PWM cycle, to provide high speed fast response PWM current control regulation.

FIG. 25 shows control circuitry and uses like reference numerals from FIG. 7 where appropriate to facilitate understanding. As above described, the $\overline{Q}$ output of flip flop 86, FIG. 8, provides the PWM switch control signal on line 46, FIGS. 7 and 25. The high state of the PWM switch control signal on line 46 disables the power switch, S1–S6, then selected by multiplexer 50, such that the power switch is off. A low state on line 46 enables the power switch, S1–S6, selected by multiplexer 50, such that the power switch turns back on. One shot monostable multivibrator 512 responds to the falling edge of the PWM switch control signal on line 46 to generate a turn-on pulse on line 514 at turn-on of the respective power switch. One shot monostable multivibrator 516 responds to the rising edge of the PWM switch control signal on line 46 to generate a turn-off pulse on line 518 at turn-off of the respective switch. One shot monostable multivibrator 520 responds to state counter 56 to generate an initializing pulse on line 522 at the beginning of the state. As shown in FIG. 26, initializing pulse 524 on line 522 occurs at the beginning of the state, e.g. state 6, and is coincident with the first turn-on pulse 526 on line 514 in the state.

FIG. 27 shows circuitry for performing the calculations in accordance with the invention. The initializing pulse on line 522, FIGS. 25 and 27, at the beginning of the state clocks the motor current value I(command) commanded by the operator for a chosen motor speed into a first sample and hold circuit 528, FIG. 27. Line 68, FIGS. 25 and 27, is connected through line 529 and amplifier 530 having a gain of 0.2 to sample and hold circuit 528. The initializing pulse on line 522 is supplied through gate 532 to close switch 534 to perform the sampling operation and store the sampled value, 0.2 I(command), in capacitor 536, which value is supplied through unity gain amplifier buffer 538 to the output 540 of sample and hold circuit 528.

The turn-on pulse on line 514 is supplied through line 542 and clocks the output at 540 of sample and hold circuit 528 into a second sample and hold circuit 544. The signal on line 542 is supplied through gate 546 to close switch 548 to perform the sampling operation. The value of the signal on line 540 is stored in capacitor 550 to perform the holding function, which value is supplied through unity gain amplifier buffer 552 and appears on the output 554 of sample and hold circuit 544 and is designated I(peak last). At the initial turn-on pulse 526 in the state, FIG. 26, the I(peak last) value is 0.2 I(command). The output of sample and hold circuit 544 is supplied through amplifier 556 having a gain of 0.5, and is then supplied to an additive input 558 of a summer 560. The I(command) signal on line 68 is supplied on line 562 through a unity gain amplifier buffer 564 to an additive input 566 of summer 560.

The turn-on pulse on line 514 is supplied on line 568 to clock the bus current signal on line 43 into a third sample and hold circuit 570. The turn-on pulse on line 568 is supplied through gate 572 to close switch 574 such that the value of the bus current signal on line 43 is stored in capacitor 576, which value is supplied through unity gain buffer amplifier 578 and appears on the output 580 of sample and hold circuit 570 and is designated I(turn-on). The I(turn-on) signal on line 580 is supplied through amplifier 582 having a gain of 0.5 to a subtractive input 584 of summer 560.

The output of summer 560 on line 586 is I(peak present). Line 586 is connected to sample and hold circuit 528. The next turn-off pulse on line 518 clocks the I(peak present) signal on line 586 into sample and hold circuit 528. The turn-off pulse on line 518 is supplied through gate 588 to close switch 590 such that the I(peak present) signal on line 586 is stored in capacitor 536 and appears at output 540 of sample and hold circuit 528.

In operation, the required peak motor current value for the present PWM cycle, I(peak present), is calculated according to the previous required peak motor current value I(peak last) and the motor current value I(command) commanded by the operator for a chosen motor speed. The previous required peak motor current value I(peak last) is from the immediately preceding PWM cycle. Motor current value I(turn-on) is sampled at turn-on of the respective switch in the PWM cycle, and the required peak motor current value for the present PWM cycle, I(peak present), is also calculated from the turn-on motor current value I(turn-on). The required peak motor current value for the present PWM cycle, I(peak present), is calculated from the commanded motor current value I(command) combined with a factor of the previous required peak motor current value I(peak last) from the immediately preceding PWM cycle combined with a factor of the turn on motor current value I(turn-on). In the disclosed embodiment, the required peak motor current value I(peak present) for the present PWM cycle is calculated according to the following equation:

$$I(\text{peak present}) = I(\text{command}) + 0.5\, I(\text{peak last}) - 0.5\, I(\text{turn-on})$$

where I(peak present) is the required peak motor current value for the present PWM cycle, I(command) is the commanded motor current value, I(peak last) is the previous required peak motor current value from the immediately preceding PWM cycle, and I(turn-on) is the turn on motor current value at the beginning of the PWM cycle.

The turn-off pulse on line 518 is used to clock the required peak motor current value from the previous PWM cycle into first sample and hold circuit 528. The turn-on pulse on line 514 is used to clock the output of the first sample and hold circuit 528 into the second sample and hold circuit 544. The turn-on pulse on line 514 is also used to clock the motor current value on line 43 at turn-on of the respective power switch into the third sample and hold circuit 570. Summer 560 combines the outputs of the second and third sample and hold circuits 544 and 570 to provide an updated required peak motor current value I(peak present) for the present PWM cycle. The motor current value I(command) commanded by the operator for a chosen motor speed is also combined in summer 560 with the output of the second and third sample and hold circuits 544 and 570 to provide the updated required peak motor current value I(peak present) for the present PWM cycle. Summer 560 additively sums the commanded motor current value, I(command), and the output of the second sample and hold circuit, 0.5 I(peak last), and subtractively sums the output of the third sample and hold circuit, 0.5 I(turn-on). The updated required peak motor current value I(peak present) from summer 60 on line 586 is supplied on line 592 to PWM current control circuit 44.

An initialization current value is provided as a substitute required peak motor current value I(peak present) at the beginning of each state such that the first calculated required peak motor current value is based on such initialization current value. The first required peak motor current value at the beginning of each state is calculated according to a factor of the motor current value I(command) commanded by the operator for a chosen motor speed. In the disclosed embodiment, this factor is 1.1. At the beginning of the state, FIG. 26, initializing pulse 524 on line 522 closes switch 534. There is no turn-off pulse on line 518 at the beginning of the state, and hence switch 590 is open. The output of first sample and hold circuit 528 at line 540 is thus 0.2 I(command). Switch 548 is also closed at the beginning of the state due to turn-on pulse 526 on line 514 through line 542. Hence, the output of sample and hold circuit 528 at line 540 is clocked into sample and hold circuit 544 at the beginning of the state, and the output of the latter is reduced by half due to amplifier 556 such that the input at 558 to summer 560 is 0.1 I(command). Input 584 to summer 560 is zero because there is no bus current at the beginning of the state and hence turn-on pulse 526 on line 514 through line 568 clocks a zero value from line 43 into sample and hold circuit 570, such that the latter's output I(turn-on) is zero. The other input 566 to summer 560 is I(command). Hence, the output at 586 of summer 560 is 1.1 I(command). This provides a substitute sampled current value I(peak present) for the first required peak motor current value in the state, such that upon the next turn on pulse, the new required peak motor current value is calculated from such substitute sampled current value.

FIG. 28 shows the I(turn-on) value starting at zero at level 600 at the beginning of the state at vertical dashed reference line 602, and remaining at zero until the second turn-on pulse in the state, turn-on pulse 604, FIG. 26, starting the second PWM cycle, as shown at step 606 to level 608 at vertical dashed reference line 610. At the third turn-on pulse in the state, turn-on pulse 612, FIG. 26, starting the third PWM cycle as shown at vertical dashed reference line 614, I(turn-on) increases at step 616 to level 618. The I(peak present) value does not start at zero, but rather starts at level 620 due to the noted substitute sampled current value, and then increases at step 622 to level 624 upon the second turn-on pulse 604 in the state at the beginning of the second PWM cycle in the state at vertical dashed reference line 610. The output 540 of sample and hold circuit 528 starts at a low level at 626, namely 0.2 I(command), and then increases at step 628 to level 630 upon turn-off pulse 632 at vertical dashed reference line 634, and then increases at step 636 to level 638 upon turn-off pulse 640 at vertical dashed reference line 642. The I(peak last) signal starts at a low level 644, namely 0.1 I(command), and then increases at step 646 to level 648 upon turn-on pulse 604 starting the second PWM cycle at vertical dashed reference line 610, and then increases at step 650 to level 652 upon turn-on pulse 612 starting the third PWM cycle at vertical dashed reference line 614.

While the present PWM current control regulation method and system have been described in conjunction with the subject matter of the above noted parent applications in FIGS. 1-23, the present invention is not limited thereto. The present PWM current control regulation method and system may be used with various other commutation methods and systems. Furthermore, the invention may be used with various types of motors, including switched reluctance motors and the commutation systems therefor, for example as in above noted application Ser. No. 07/356,375.

The invention maintains average current at a fixed level regardless of motor speed and inductance without adding delays by time averaging the current waveform or requiring more than one current sensor. In accordance with the invention, the DC bus current is sampled at the start of each PWM cycle when both switches are turned on, and added to the peak current from the previous PWM cycle. This sum is divided in half to give the average bus current, as shown at dashed line 654, FIGS. 26 and 28. The average phase current is shown at 656. The method of the invention of determining average current is independent of the ripple in the current waveform, and hence is not subject to the drawbacks noted in conjunction with FIG. 24. In the present invention, the determined average current is compared to the desired current and is used to calculate the required peak current for the PWM cycle in progress. The sample and hold circuits store the two current levels and the disclosed circuitry performs the necessary scaling, additions and subtractions.

The equation used to calculate the peak current for the PWM cycle in progress is:

$$I(\text{peak present}) = I(\text{command}) + I(\text{peak last}) - I(\text{average})$$

where $I(\text{average})$ is the measured average current noted above, and $I(\text{command})$ is the desired average current. Since $$I(\text{average}) = 0.5\, I(\text{peak last}) + 0.5\, I(\text{turn-on})$$

the equation reduces to $$I(\text{peak present}) = I(\text{command}) + 0.5\, I(\text{peak last}) - 0.5\, I(\text{turn-on})$$

where I(peak present) is the calculated peak current for the present PWM cycle, e.g. peak point 658 for the second PWM cycle, I(peak last) is the peak current from the previous PWM cycle, e.g. peak point 660, I(command) is the desired average current, and I(turn-on) is the current at the start of the present PWM cycle, e.g. point 662. The ratios of the various currents in the control equation are not limited to the values shown. The values chosen are preferred to give minimum settling time for a change in the desired current I(command). Other ratios will still function with either an undershoot or an overshoot to a change in I(command). For some applications this may be desirable.

FIGS. 25 and 27 show the hardware used to implement the above equation. As above noted, the turn-off pulse is a short pulse that occurs when the peak current is reached during each PWM cycle, e.g. points 660, 658, etc. at vertical dashed reference lines 634, 642, etc., FIGS. 26 and 28. The turn-on pulse is a short pulse that occurs at the start of each PWM cycle, e.g. vertical dashed reference lines 602, 610, 614, etc., FIGS. 26 and 28. The bus current is the signal from the DC bus current sensor on line 43. The current command I(command) is a signal proportional to the desired average current. The initializing pulse is a short pulse that occurs when the control switches to a new state or a new phase winding, e.g. vertical dashed reference line 602, FIGS. 26 and 28. The initializing pulse may be used to reset the I(peak present) sample and hold circuit 528 to zero for the new winding. This will result in the first calculated I(peak present) to be equal to I(command). A further refinement is to set the I(peak present) sample and hold circuit 528 to a percentage of I(command) to estimate the peak current for the first PWM cycle. This is accomplished in FIG. 27 with amplifier 530 having a gain of 0.2 and the additional sample and hold input switch 534 controlled by the initializing pulse on line 522 through gate 532. This circuit results in the first I(peak present) to be I(command) plus 10%, i.e. 1.1 I(command). Another refinement would be to save the last value of I(peak present) from the previous state or phase, and set the initial estimate for I(peak present) in the new motor phase to that value.

Other circuitry may be used to implement the method of the present invention, including use of a microprocessor. DC bus current can be converted to a digital value by an analog to digital converter and read by the microprocessor at the necessary times. The values for I(peak present) may be calculated in software by the microprocessor and sent to a digital to analog converter which supplies an analog signal to a comparator whose output changes state when the bus current exceeds the digital to analog signal and is read by the microprocessor. The microprocessor then turns off the appropriate transistor or power switch to pulse width modulate the motor current.

It is recognized that various equivalents, alternatives and modifications are possible within the scope of the appended claims.

I claim:

1. A control method for an electric motor comprising energizing said motor through pulse width modulated switch means to apply energization voltage to said motor in an on condition of said switch means until motor current reaches a given peak value, and then turning off said switch means such that motor current decreases, and then turning said switch means back on until motor current again increases to said peak value, and then turning off said switch means, and so on, to regulate motor current, each pair of on and off conditions of said switch means constituting a PWM cycle, sampling the required peak motor current value from a previous PWM cycle, I(peak last), sampling motor current value at turn-on of said switch means, I(turn-on), and calculating the required peak motor current value for the present PWM cycle, I(peak present), from both I(peak last) and I(turn-on), to provide high speed fast response PWM current control regulation.

2. The control method according to claim 1 comprising repeating said sampling and calculating every PWM cycle, and updating the new required peak motor current value every PWM cycle.

3. The control method according to claim 2 comprising calculating the required peak motor current value for the present PWM cycle according to said previous required peak motor current value and said sampled motor current value at turn-on of said switch means and the motor current value commanded by the operator for a chose motor speed, I(command).

4. The control method according to claim 3 wherein said previous required peak motor current value is from the immediately preceding PWM cycle.

5. The control method according to claim 1 comprising repeating said sampling and calculating every PWM cycle, updating the new required peak motor current value every PWM cycle, calculating the required peak motor current value for the present PWM cycle according to said previous required peak motor current value and said sampled motor current value at turn-on of said switch means and the motor current value commanded by the operator for a chosen motor speed, I(command), wherein said previous required peak motor current value is from the immediately preceding PWM cycle, calculating the required peak motor current value for the current PWM cycle from said commanded motor current value combined with a factor of said previous required peak motor current value from the immediately preceding PWM cycle combined with a factor of said turn-on motor current value.

6. The control method according to claim 5 comprising calculating the required peak motor current value for the present PWM cycle according to the following equation:

$$I(\text{peak present}) = I(\text{command}) + 0.5\, I(\text{peak last})\, 0.5\, I(\text{turn-on})$$

where I(peak present) is the required peak motor current value for the present PWM cycle, I(command) is said commanded motor current value, I(peak last) is said previous required peak motor current value from the immediately preceding PWM cycle, and I(turn-on) is said turn-on motor current value.

7. A control method for an electric motor comprising energizing said motor through pulse width modulated switch means to apply energization voltage to said motor in an on condition of said switch means until motor current reaches a given peak value, and then turning off said switch means such that motor current decreases, and then turning said switch means back on until motor current again increases to said peak value, and then turning off said switch means, and so on, to regulate motor current, each pair of on and off conditions of said switch means constituting a PWM cycle, generating a turn-on pulse at turn-on of said switch means, generating a turn-off pulse at turn-off of said switch means, using said turn-off pulse to clock the required peak motor current value into a first sample and hold circuit, using said turn-on pulse to clock the output of said first sample and hold circuit into a second sample and hold circuit, also using said turn-on pulse to clock motor current value at turn-on of said switch means into a third sample and hold circuit, combining the outputs of said second and third sample and hold circuits to provide an updated required peak motor current value for the present PWM cycle.

8. The control method according to claim 7 comprising combining the motor current value commanded by the operator for a chosen motor speed with said outputs of said second and third sample and hold circuits to provide said updated required peak motor current value for the present PWM cycle.

9. The control method according to claim 8 comprising providing a summer and summing the outputs of said second and third sample and hold circuits and said commanded motor current value.

10. The control method according to claim 9 comprising additively summing said commanded motor current value and said output of said second sample and hold circuit and subtractively summing said output of said third sample and hold circuit.

11. The control method according to claim 9 comprising amplifying said output of said second sample and hold circuit by a given factor, and amplifying said output of said third sample and hold circuit by a given factor.

12. The control method according to claim 11 wherein each of said given factors is 0.5.

13. The control method according to claim 12 comprising calculating the required peak motor current value for the present PWM cycle according to the following equation $$I(\text{peak present}) = I(\text{command}) + 0.5\, I(\text{peak last}) - 0.5\, I(\text{turn-on})$$

where I(peak present) is the required peak motor current value for the present PWM cycle, I(command) is the commanded motor current value I(peak last) is the previous required peak motor current value from the immediately preceding PWM cycle, and I(turn-on) is the turn on motor current value.

14. A control method for an electric motor comprising energizing said motor through pulse width modulated switch means to apply energization voltage to said motor in an on condition of said switch means until motor current reaches a given peak value, and then turning off said switch means such that motor current decreases, and then turning said switch means back on until motor current again increases to said peak value, and then turning off said switch means, and so on, to regulate motor current, each pair of on and off conditions of said switch means constituting a PWM cycle, sampling the required peak motor current value from a previous PWM cycle, I(peak last), sampling motor current value at turn-on of said switch means, I(turn-on), and calculating the required peak motor current value for the present PWM cycle, I(peak present), from both I(peak last) and I(turn-on), to provide high speed fast response PWM current control regulation, said motor comprising a plurality of phases energized in a cyclic sequence comprising a plurality of states, each state comprising a plurality of PWM cycles, and providing an initialization current value as a substitute sampled required peak motor current value at the beginning of each said state such that the first calculated peak motor current value is based on said initialization current value.

15. The control method according to claim 14 comprising calculating the first required peak motor current value in each state according to a factor of the motor current value commanded by the operator for a chosen motor speed, and for the remainder of the state calculating the required peak motor current value for the present PWM cycle according to said previous required peak motor current value and according to the motor current value commanded by the operator for a chosen motor speed.

16. The control method according to claim 15 comprising repeating said sampling and calculating every PWM cycle, and updating the new required peak motor current value every PWM cycle, wherein said previous required peak motor current value is from the immediately preceding PWM cycle, and calculating the required peak motor current value for the present PWM cycle from said commanded motor current value combined with a factor of said previous required peak motor current value from the immediately preceding PWM cycle combined with a factor of said turn-on motor current value.

17. A control method for an electric motor comprising energizing said motor through pulse width modulated switch means to apply energization voltage to said motor in an on condition of said switch means until motor current reaches a given peak value, and then turning off said switch means such that motor current decreases, and then turning said switch means back on until motor current again increases to said peak value, and then turning off said switch means, and so on, to regulate motor current, each pair of on and off conditions of said switch means constituting a PWM cycle, sampling the required peak motor current value from a previous PWM cycle, I(peak last), sampling motor current value at turn-on of said switch means, I(turn-on), and calculating the required peak motor current value for the present PWM cycle, I(peak present), from both I(peak last) and I(turn-on), to provide high speed fast response PWM current control regulation, said motor comprising a plurality of phases energized in a cyclic sequence comprising a plurality of states, providing a turn-on pulse at turn-on of said switch means coincident with the start of a new PWM cycle, providing a turn-off pulse at turn-off of said switch means, providing an initializing pulse at the beginning of each said state coincident with the first turn-on pulse in said state, and using said initializing pulse to provide a substitute sampled current value for the first required peak motor current value in the state, such that upon the next turn-on pulse, the new required peak motor current value is calculated from said substitute sampled current value.

18. The control method according to claim 17 comprising using said initializing pulse to clock said substitute sampled current value into a first sample and hold circuit, using said turn-on pulse to clock the output of said first sample and hold circuit into a second sample and hold circuit, also using said turn-on pulse to clock motor current value at turn-on of said switch means into a third sample and hold circuit, combining the outputs of said second and third sample and hold circuits to provide an updated peak motor current value for the present PWM cycle, using said turn off pulse to clock said required peak motor current value into said first sample and hold circuit.

19. The control method according to claim 18 comprising combining the motor current value commanded by the operator for a chosen motor speed with said outputs of said second and third sample and hold circuits to provide said updated required peak motor current value for the present PWM cycle.

20. The control method according to claim 19 comprising providing a summer and summing the outputs of said second and third sample and hold circuits and said commanded motor current value by additively summing said commanded motor current value and said output of said second sample and hold circuit and subtractively summing said output of said third sample and hold circuit, amplifying said output of said second sample and hold circuit by a given factor, and amplifying said output of said third sample and hold circuit by a given factor.

21. The control method according to claim 20 comprising calculating the required peak motor current value for the present PWM cycle according to the following equation $$I(\text{peak present}) = I(\text{command}) + 0.5\, I(\text{peak last}) - 0.5\, I(\text{turn-on})$$

where I(peak present) is the required peak motor current value for the present PWM cycle, I(command) is the commanded motor current value, I(peak last) is the previous required peak motor current value from the immediately preceding PWM cycle, and I(turn on) is the turn on motor current value.

22. The control method according to claim 17 comprising calculating the first required peak motor current value in each state according to a factor of the motor current value commanded by the operator for a chosen motor speed, and for the remainder of the state calculating the required peak motor current value for the present PWM cycle according to said previous required peak motor current value and said sampled motor current value at turn-on of said switch means and the motor current value commanded by the operator for a chosen motor speed.

23. The control method according to claim 22 comprising repeating said sampling and calculating every PWM cycle, and updating the new required peak motor current value every PWM cycle, wherein said previous required peak motor current value is from the immediately preceding PWM cycle, and calculating the required peak motor current value for the present PWM cycle from said commanded motor current value combined with a factor of said previous required peak motor current value from the immediately preceding PWM cycle combined with a factor of said turn-on motor current value.

24. Control circuitry for an electric motor comprising means energizing said motor through pulse width modulated switch means to apply energization voltage to said motor in an on condition of said switch means until motor current reaches a given peak value, whereafter said switch means is turned off such that motor current decreases, whereafter said switch means is turned back on until motor current again increase to said peak value, whereafter said switch means is turned off, and so on, to regulate motor current, each pair of on and off conditions of said switch means constituting a PWM cycle, means sampling the required peak motor current value from a previous PWM cycle, I(peak last), means sampling motor current value at turn-on of said switch means, I(turn-on), and means calculating the required peak motor current value for the present PWM cycle, I(peak present), from both I(peak last) and I(turn-on), to provide high speed fast response PWM current control regulation.

25. The control circuitry according to claim 24 comprising means repeating said sampling and calculating every PWM cycle, and updating the new required peak motor current value every PWM cycle.

26. The control circuitry according to claim 25 comprising means calculating the required peak motor current value for the present PWM cycle according to said previous required peak motor current value and said sampled motor current value at turn-on of said switch means and the motor current value commanded by the operator for a chosen motor speed, I(command).

27. The control circuitry according to claim 26 wherein said previous required peak motor current value is from the immediately preceding PWM cycle.

28. The control circuitry according to claim 25 comprising means repeating said sampling and calculating every PWM cycle, and updating the new required peak motor current value every PWM cycle, means calculating the required peak motor current value for the present PWM cycle according to said previous required peak motor current value and said sampled motor current value at turn-on of said switch means and the motor current value commanded by the operator for a chosen motor speed, I(command), wherein said previous required peak motor current value is from the immediately preceding PWM cycle, means calculating the required peak motor current value for the present PWM cycle from said commanded motor current value combined with a factor of said previous required peak motor current value from the immediately preceding PWM cycle combined with a factor of said turn-on motor current value.

29. The control circuitry according to claim 28 comprising means calculating the required peak motor current value for the present PWM cycle according to the following equation $$I(\text{peak present}) = I(\text{command}) + 0.5\, I(\text{peak last}) - 0.5\, I(\text{turn-on})$$

where I(peak present) is the required peak motor current value for the present PWM cycle, I(command) is the commanded motor current value, I(peak last) is the previous required peak motor current value from the immediately preceding PWM cycle, and I(turn-on) is the turn-on motor current value.

30. Control circuitry for an electric motor comprising means energizing said motor through pulse width modulated switch means to apply energization voltage to said motor in an on condition of said switch means until motor current reaches a given peak value, whereafter said switch means is turned off such that motor current decreases, whereafter said switch means is turned back on until motor current again increases to said peak value, whereafter said switch means is turned off, and so on, to regulate motor current, each pair of on and off conditions of said switch means constituting a PWM cycle, means generating a turn-on pulse at turn-on of said switch means, means generating a turn-off pulse at turn-off of said switch means, a first sample and hold circuit clocked by said turn-off pulse to sample and hold the required peak motor current value, a second sample and hold circuit clocked by said turn-on pulse to sample and hold the output of said first sample and hold circuit, a third sample and hold circuit also clocked by said turn-on pulse to sample and hold motor current value at turn-on of said switch means, means combining the outputs of said second and third sample and hold circuits to provide an updated required peak motor current value for the present PWM cycle.

31. The control circuitry according to claim 30 wherein said means combining the outputs of said second and third sample and hold circuits also combines the motor current value commanded by the operator for a chosen speed with said outputs of said second and third sample and hold circuits to provide said updated required peak motor current value for the present PWM cycle.

32. The control circuitry according to claim 31 wherein said last mentioned means comprises a summer summing the outputs of said second and third sample and hold circuits and said commanded motor current value.

33. The control circuitry according to claim 32 wherein said summer additively sums said commanded motor current value and said output of said second sample and hold circuit and subtractively sums said output of said third sample and hold circuit.

34. The control circuitry according to claim 32 comprising an amplifier amplifying said output of said second sample and hold circuit by a given factor, and another amplifier amplifying said output of said third sample and hold circuit by a given factor.

35. The control circuitry according to claim 34 wherein each of said given factors is 0.5.

36. The control circuitry according to claim 35 comprising means calculating the required peak motor current value for the present PWM cycle according to the following equation $$I(\text{peak present}) = I(\text{command}) + 0.5\, I(\text{peak last}) - 0.5\, I(\text{turn-on})$$

where I(peak present) is the required peak motor current value for the present PWM cycle, I(command) is the commanded motor current value, I(peak last) is the previous required peak motor current value from the immediately preceding PWM cycle, and I(turn-on) is the turn-on motor current value.

37. Control circuitry for an electric motor comprising means energizing said motor through pulse width modulated switch means to apply energization voltage to said motor in an on condition of said switch means until motor current reaches a given peak value, whereafter said switch means is turned off such that motor current decreases, whereafter said switch means is turned back on until motor current again increases to said peak value, whereafter said switch means is turned off, and so on, to regulate motor current, each pair of on and off conditions of said switch means constituting a PWM cycle, means sampling the required peak motor current value from a previous PWM cycle, I(peak last), means sampling motor current value at turn-on of said switch means, I(turn-on), and means calculating the required peak motor current value for the present PWM cycle, I(peak present), from both I(peak last) and I(turn-on), to provide high speed fast response PWM current control regulation, said motor comprising a plurality of phases energized in a cyclic sequence comprising a plurality of states, each state comprising a plurality of PWM cycles, means providing an initialization current value as a substitute sampled required peak motor current value at the beginning of each state such that the first calculated required peak motor current value is based on said initialization current value.

38. The control circuitry according to claim 37 comprising means calculating the first required peak motor current value in each state according to a factor of the motor current value commanded by the operator for a chosen motor speed, and means effective for the remainder of the state calculating the required peak motor current value for the present PWM cycle according to said previous required peak motor current value and the motor current value commanded by the operator for a chosen motor speed.

39. The control circuitry according to claim 38 comprising means repeating said sampling and calculating every PWM cycle, and updating the new required peak motor current value every PWM cycle, wherein said previous required peak motor current value is from the immediately preceding PWM cycle, and means calculating the required peak motor current value for the present PWM cycle from the commanded motor current value combined with a factor of the previous required peak motor current value from the immediately preceding PWM cycle combined with a factor of the turn-on motor current value.

40. Control circuitry for an electric motor comprising means energizing said motor through pulse width modulated switch means to apply energization voltage to said motor in an on condition of said switch means until motor current reaches a given peak value, whereafter said switch means is turned off such that motor current decreases, whereafter said switch means is turned back on until motor current again increases to said peak value, whereafter said switch means is turned off, and so on, to regulate motor current, each pair of on and off conditions of said switch means constituting a PWM cycle, I(peak last), means sampling motor current value at turn-on of said switch means, I(turn-on), means sampling the required peak motor current value from a previous PWM cycle and means calculating the required peak motor current value for the present PWM cycle, I(peak present), from both I(peak last) and I(turn-on), to provide high speed fast response PWM current control regulation, said motor comprising a plurality of phases energized in a cyclic sequence comprising a plurality of states, means generating a turn-on pulse at turn-on of said switch means coincident with the start of a new PWM cycle, means generating a turn-off pulse at turn-off of said switch means, means generating an initiating pulse at the beginning of each state and coincident with the first turn-on pulse in the state, means responsive to said initializing pulse and providing a substitute sampled current value for the first required peak motor current value in the state, such that upon the next turn-on pulse, the new required peak motor current value is calculated from said substitute sampled current value.

41. The control circuitry according to claim 40 comprising a first sample and hold circuit clocked by said initializing pulse to sample and hold said substitute sampled current value, a second sample and hold circuit clocked by said turn-on pulse to sample and hold the output of said first sample and hold circuit, a third sample and hold circuit also clocked by said turn-on pulse to sample and hold motor current value at turn-on of said switch means, means combining the outputs of said second and third sample and hold circuits to provide an updated required peak motor current value for the present PWM cycle, said first sample and hold circuit also being clocked by said turn-off pulse to sample and hold the required peak motor current value.

42. The control circuitry according to claim 41 wherein said means combining the outputs of said second and third sample and hold circuits also combines the motor current value commanded by the operator for a chosen motor speed with said outputs at said second and third sample and hold circuits to provide said updated required peak motor current value for the present PWM cycle.

43. The control circuitry according to claim 42 comprising a summer additively summing said commanded motor current value and said output of said second sample and hold circuit and subtractively summing said output of said third sample and hold circuit, and comprising an amplifier amplifying said output of said second sample and hold circuit by a given factor, and another amplifier amplifying said output of said third sample and hold circuit by a given factor.

44. The control circuitry according to claim 43 comprising means calculating the required peak motor current value for the present PWM cycle according to the following equation $$I(\text{peak present}) = I(\text{command}) + 0.5\, I(\text{peak last}) - 0.5\, I(\text{turn-on})$$

where I(peak present) is the required peak motor current value for the present PWM cycle, I(command) is the commanded motor current value, I(peak last) is the previous required peak motor current value from the immediately preceding PWM cycle, and I(turn-on) is the turn-on motor current value.

45. The control circuitry according to claim 40 comprising means calculating the first required peak motor current value in each state according to a factor of the motor current value commanded by the operator for a chosen motor speed, and means effective for the remainder of the state calculating the required peak motor current value for the present PWM cycle according to said previous required peak motor current value and said sampled motor current value at turn-on of said switch means and the motor current value commanded by the operator for a chosen motor speed.

46. The control circuitry according to claim 45 comprising means repeating said sampling and calculating every PWM cycle, and updating the new required peak motor current value every PWM cycle, wherein said previous required peak motor current value is from the immediately preceding PWM cycle, and means calculating the required peak motor current value for the present PWM cycle from the commanded motor current value combined with a factor of the previous required peak motor current value from the immediately preceding PWM cycle combined with a factor of the turn-on motor current value.

* * * * *